United States Patent
Dutta

(10) Patent No.: US 11,252,264 B1
(45) Date of Patent: Feb. 15, 2022

(54) LOAD BALANCING A TCP CONNECTION ACROSS MULTIPLE PATHS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 3 days.

(21) Appl. No.: 16/935,587

(22) Filed: Jul. 22, 2020

(51) Int. Cl.
 *H04L 29/06* (2006.01)
 *H04L 29/08* (2006.01)

(52) U.S. Cl.
 CPC .......... *H04L 69/161* (2013.01); *H04L 67/141* (2013.01); *H04L 67/28* (2013.01); *H04L 69/163* (2013.01)

(58) Field of Classification Search
 USPC ........................................................ 709/230
 See application file for complete search history.

(56) References Cited

U.S. PATENT DOCUMENTS

| | | | |
|---|---|---|---|
| 7,003,574 B1* | 2/2006 | Bahl | H04L 29/06 709/203 |
| 10,075,987 B2 | 9/2018 | Teyeb et al. | |
| 2012/0063314 A1 | 3/2012 | Pignataro et al. | |
| 2016/0094467 A1* | 3/2016 | Hong | H04L 63/0281 370/235 |
| 2016/0218960 A1* | 7/2016 | Sundarababu | H04L 45/08 |
| 2017/0317920 A1* | 11/2017 | Rocquelay | H04L 45/74 |

FOREIGN PATENT DOCUMENTS

EP 3 675 558 A1 7/2020

OTHER PUBLICATIONS

"MCTCP: A Multipath Transport Shim Layer", Scharf et al., 2011 IEEE Global Telecommunications Conference—GLOBECOM 2011, 2011, pp. 1-5. (Year: 2011).*
Cotton, et al., "Internet Assigned Numbers Authority (IANA) Procedures for the Management of the Service Name and Transport Protocol Port Number Registry", Internet Engineering Task Force (IETF), RFC 6335, Aug. 2011, 33 pages.

(Continued)

*Primary Examiner* — Backhean Tiv
*Assistant Examiner* — Jonathan A Sparks
(74) *Attorney, Agent, or Firm* — Tong, Rea, Bentley & Kim, LLC

(57) ABSTRACT

A source of a transmission control protocol (TCP) connection includes a processor to establish the TCP connection based on a TCP source port number and a TCP destination port number associated with a destination. The processor also generates a TCP shim header including the TCP source port number and the TCP destination port number. The processor further generates a plurality of TCP headers including a plurality of proxy port numbers and a shim port number that indicates the TCP shim header. The source also includes a transceiver to transmit a plurality of packets comprising the plurality of TCP headers and the TCP shim header. The destination of the TCP connection includes a processor configured to establish the TCP connection and a transceiver to receive the plurality of packets via the TCP connection.

24 Claims, 22 Drawing Sheets

(56) References Cited

OTHER PUBLICATIONS

"Transmission Control Protocol", DARPA Internet Program, Protocol Specification, RFC 793, Sep. 1981, 89 pages.
Stewart, "Stream Control Transmission Protocol", Network Working Group, RFC 4960, Sep. 2007, 152 pages.
Postel, "User Datagram Protocol", RFC 768, Aug. 28, 1980, 3 pages.
"Service Name and Transport Protocol Port Number Registry", Accessed May 26, 2020, 4 pages.
Ford, et al., "TCP Extensions for Multipath Operation with Multiple Addresses", Internet Engineering Task Force (IETF), RFC 6824, Jan. 2013, 64 pages.
EP Search Report dated Dec. 9, 2021 in corresponding EP Application No. 21181642.6, 9 pages.

\* cited by examiner

LOAD BALANCING A TCP CONNECTION ACROSS MULTIPLE PATHS

BACKGROUND

The transmission control protocol (TCP) is a transport layer protocol that provides reliable, ordered, and error-checked delivery of a stream of octets (bytes) between applications running on devices communicating via an Internet protocol (IP) network. The TCP protocol is used by internet applications such as the World Wide Web, email, remote administration, and file transfer. The TCP protocol is a connection-oriented protocol and devices at the end points (sometimes referred to as nodes) are required to establish a connection before sending data via the TCP connection. The TCP protocol uses a 3-way handshake protocol to establish the TCP connection between two endpoints, including synchronizing the endpoints and negotiating connection settings. Control data is passed between the endpoints to establish the TCP connection during the connection establishment (or call set up) phase. The TCP protocol operates in a client-server paradigm: the endpoint that initiates a TCP connection is the client and the endpoint that receives and responds to incoming connection requests is the server. Once the TCP connection is established, the client (or source) initiates use of the TCP connection by sending a synchronization (SYN) packet toward a sever (or destination). The destination acknowledges receipt of the SYN packet with a SYN-ACK packet sent toward the source. Upon receipt of the SYN-ACK packet from the destination, the source responds with an acknowledgement (ACK) packet that concludes the establishment phase. The TCP connection between the source and the destination is identified by a four-tuple: {source IP address, source port, destination IP address, destination port}. The source port and destination port are included in a TCP header of the packets that are transmitted over the TCP connection and source IP address and destination IP address are included in the IP header that encapsulates the TCP header of the packets over the TCP connection.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
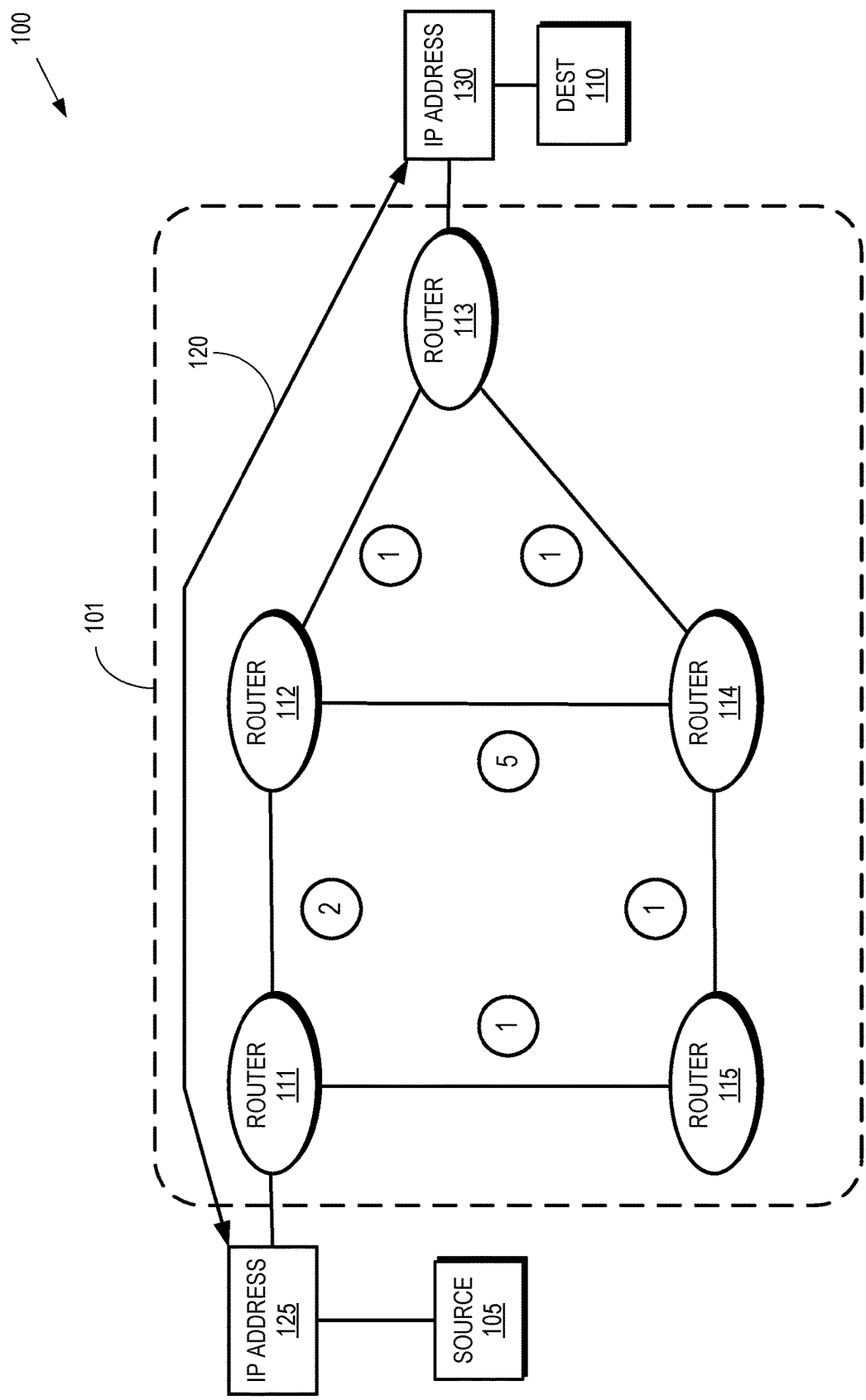
FIG. 1 is a block diagram of a communication system that includes a network to convey transmission control protocol (TCP) packets over a TCP connection.

A network typically includes multiple nodes (such as routers) that support multiple potential paths from the source to the destination via the network. Links between the nodes in the network are characterized by costs and paths through the network are evaluated based on the total cost of the links along the path. The nodes choose the path between the source and destination that has the lowest cost. The node then chooses the path for a packet by hashing information in the packet. In some cases, the nodes support equal cost multipath (ECMP), which allows the node to consider multiple paths between the source and destination that have the same (or similar) cost. Nodes that support ECMP perform load-balancing by selecting among the available ECMP paths using hashed values of information included in the packets. The information used to compute the hash varies between the packets and so this information can be used to differentiate between the available ECMP paths. Load balancing occurs because packets having different values of the hashed information are routed along different ECMP paths. However, conventional load-balancing over different ECMP paths cannot be used for packets transmitted over a TCP connection. Nodes identify the path for a packet over a TCP connection using the four-tuple derived from the TCP header and its encapsulating IP header. The four-tuple cannot be changed without breaking the connection and all packets transmitted over the TCP connection include the same four-tuple. The hashed value of the four-tuple is therefore the same for all packets transmitted over the TCP connection.

Multipath TCP (MPTCP) is used to leverage the resources of multiple TCP connections (which are also referred to as sub-connections or sub-flows) to load balance packets over different paths through the network. In MPTCP, one or both endpoints of the MPTCP connection are multi-homed and multi-addressed so that the endpoint(s) have multiple IP interfaces to the network and corresponding multiple IP addresses. For example, if a source has two IP interfaces and the destination has one IP interface, an MPTCP connection is formed including two TCP connections: one that connects the first IP interface at the source with the IP interface at the destination and another that connects the second IP interface at the source with the IP interface at the destination. The four-tuples for the two TCP connections in the MPTCP connection are different and hashed values of the four-tuples can be used to select different paths through the network for the different TCP connections in the MPTCP connection. Another option is to establish multiple TCP connections between endpoints using a single IP interface but assigning different port numbers to the different TCP connections in the MPTCP connection, which is typically the case when endpoints are either single homed or single-addressed. However, there are multiple difficulties involved in implementing MPTCP. For example, all the individual TCP connections in an MPTCP connection require handling and state maintenance for a TCP connection, which increases the implementation code complexity. For another example, middleboxes such as transparent TCP proxies, network address translation, and firewalls often remove MPTCP options in TCP headers, which forces the MPTCP connection to fall back to a single TCP connection. The uncertainty introduced by the middleboxes make it more difficult to identify root causes of bugs, errors, or failures.

FIGS. 1-23 disclose load balancing of TCP connection packets at intermediate routers using standard TCP instead of MPTCP for endpoints of a TCP connection that uses a single address in the connection, e.g., when the endpoints are either single-homed or multi-homed but single-addressed. A source implements a TCP shim layer that extends the TCP layer. The TCP shim layer carries a TCP shim header that is pushed onto packets transmitted over TCP connections between the source and a destination. A TCP packet generated by the source has a TCP header that includes an arbitrary source port number selected by the source and a destination port number that indicates a TCP shim header that includes the actual TCP source port number and a TCP destination port number that identifies the TCP connection between the source and the destination. The source chooses different values of the arbitrary source port number for the TCP header to allow routers in the network to independently route (and therefore load balance) the TCP packets that include the different source port numbers in their TCP headers over different network paths, while preserving the single TCP connection indicated by the TCP source port number and the TCP destination port number in the TCP shim header. In some embodiments, the TCP connection is multi-homed but single-addressed, e.g., an endpoint of the TCP connection is a router that uses a single loopback IP address for the TCP connection such that the loopback IP address is routable via multiple interfaces To establish the TCP connection, the source creates state information for the TCP connection that is represented by a four-tuple including the source IP address, the destination IP address, the TCP source port number, and the TCP destination port number. The source transmits a first packet to the destination with a TCP header including a first source port number and a destination port number that indicates a TCP shim layer. A TCP shim header in the first packet includes the TCP source port number and the TCP destination port number that identifies the TCP connection. In response to receiving the first packet that has the TCP shim layer destination port number in the TCP header, the destination reads the TCP shim header and creates the TCP connection with the four-tuple of the source IP address, the destination IP address, the TCP source port number, and the TCP destination port number. The destination responds with a second packet that has a TCP header including a second source port number selected by the destination and the destination port number that indicates the TCP shim layer. The TCP shim header in the second packet includes the TCP source port number and TCP destination port number that identifies the TCP connection. For example, the value of the source port in the second packet equals the value of the destination port in first packet, and the value of the destination port in the second packet is equal to the value of the source port in the first packet. In response to receiving the second packet, the source reads the TCP header including the TCP shim layer destination port number. The source therefore reads the TCP source port number and TCP destination port number from the TCP shim header and builds the four-tuple. The source acknowledges creation of the TCP connection by sending a third packet with the first source port number and the TCP shim layer destination port number in the TCP header and the TCP source port number and TCP destination port number in the TCP shim header. Subsequently, the source sends TCP packets with a TCP header including one or more third source port numbers selected by the source and the TCP shim header destination port. The TCP shim headers in the TCP packets include the TCP source port number and TCP destination port number that identifies the TCP connection. Similarly, when the destination sends a packet to source, the destination server randomly varies the source port number in the TCP header so that the packet is load balanced in the server-to-client direction. Routers in the network therefore independently route (load balance) the TCP packets based on the third source port numbers in the TCP header.

FIG. 1 is a block diagram of a communication system 100 that includes a network 101 to convey TCP packets over a TCP connection. The communication system 100 provides communication pathways such as a TCP connection to convey packets from a source 105 to a destination 110 via a set of routers 111, 112, 113, 114, 115, which are collectively referred to herein as "the routers 111-115." The routers 111-115 determine paths between the source 105 and the destination 110 based upon weights or metrics associated with links between the routers 111-115, which are indicated by the numbers in the circles adjacent the links. For example, the metric associated with the link between the router 111 and the router 112 is two and the metric associated with the link between the router 112 and the router 114 is five. The router 111 determines that the shortest path includes the routers 111-113 at a total cost of three. The path including the routers 111-113 is therefore the primary path from the source 105 to the destination 110. Additional equal cost paths are also available to convey packets between the source 105 and the destination 110. For example, the path connecting routers 111, 115, 114, 113 also has a total cost of three. However, as discussed herein, a conventional TCP connection cannot load balance over multiple paths.

In the illustrated embodiment, the source 105 and the destination 110 establish a TCP connection 120 over the primary path that traverses the router 111, the router 112, and the router 113, which is the egress router for the destination 110. The source 105 is single homed with source IP address 125 that is set to 10.11.12.13 and a source TCP port 100. The destination 110 is also single homed with the destination IP address 130 that is set to 20.21.22.23 and a destination TCP port 200. The TCP connection 120 is identified by a four-tuple:

{source IP address, destination IP address, source TCP port, destination TCP port}

All packets belonging to the TCP connection 120 include this four-tuple. Once the TCP connection 120 has been established, the elements of the four-tuple cannot be changed without breaking the TCP connection 120. Thus, the routers 111-115 cannot load balance the packets to other paths such as the equal cost path connecting the routers 111, 115, 114, 113. For example, when the router 111 receives a packet including the four-tuple from the source 105, the router 111 hashes the four-tuple {10.11.12.13, 20.21.22.23, 100, 200} and uses the hash value to map the packet onto the path including the routers 111-113.

Figure 2:
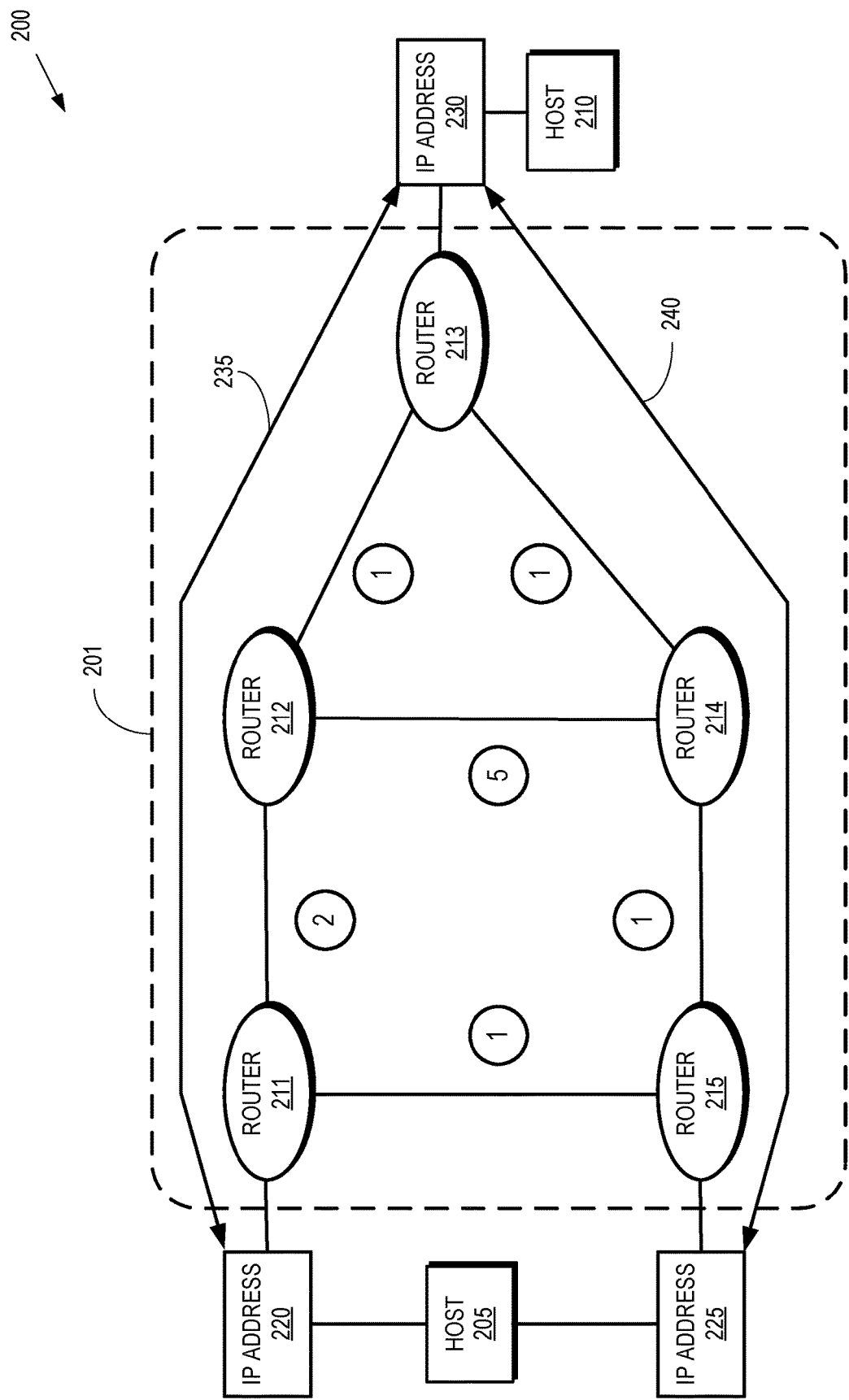
FIG. 2 is a block diagram of a communication system that includes a network to convey packets over multiple paths using multipath TCP (MPTCP).

FIG. 2 is a block diagram of a communication system 200 that includes a network 201 to convey packets over multiple paths using multipath TCP (MPTCP). Load-balancing packets on a TCP connection over multiple paths can be performed using the multipath TCP (MPTCP), which requires that one or both of the endpoints of the TCP connection are multi-homed and multi-addressed so that at least one endpoint has multiple IP interfaces to the network.

The communication system 200 provides communication pathways to convey packets from a host 205 to a host 210 via a set of routers 211, 212, 213, 214, 215, which are collectively referred to herein as "the routers 211-215." In the illustrated embodiment, the host 205 is multi-homed and multi-addressed and supports two interfaces with the network 201 based on the IP addresses 220, 225 that have the values 10.11.12.13 and 10.11.12.14, respectively. The interfaces use the source TCP port 100. The host 210 is single-homed and single-addressed and supports a single interface with the network 201 based on the IP address 230, which as the value 20.21.22.23. The destination interface uses the destination TCP port 200. As discussed herein, the routers 211-215 support multiple equal cost paths. In the illustrated embodiment, the equal cost multipath (ECMP) paths include a first path via the routers 211-213, a second path via the routers 211, 215, 214, 213, and a third path via the routers 215, 214, 213.

To enable multipath capability, MPTCP combines several TCP connections into a single Multipath TCP connection. Each member TCP connection is referred to as a "subflow." The first subflow 235 starts with a three-way handshake, which is similar to a conventional TCP connection except that the SYN packet transmitted from the host 205 contains an MP_CAPABLE option in TCP that negotiates the use of Multipath TCP and random keys. In FIG. 2, a first subflow 235 is established between the host 205 and the host 210 with {TCP port 100, IP address 10.11.12.13} on the first interface to the host 205 and {TCP port 200, IP address 20.21.22.23} on the interface to the host 210. In response to receiving TCP packets from the host 205 on the first subflow 235, the router 211 can route the TCP packets on either the first path or the second path. The router 211 hashes on the four-tuple {Source IP address 10.11.12.13, Destination IP address 20.21.22.23, TCP source port 100, TCP destination port 200}, which results in mapping the packets of the first subflow 235 on the first path via the routers 211-213.

Once the first subflow 235 has been established, either the host 205 or the host 210 can create one or more additional subflows from any host IP addresses toward any other IP addresses of a remote host by sending a new SYN with the MP_JOIN option. For example, in FIG. 2, a second subflow 240 is established between the host 205 and the host 210 with {TCP port 100, IP address 10.11.12.14} on the second interface to the host 205 and {TCP port 200, IP address 20.21.22.23} on the interface to the host 210. In response to receiving packets for the host 210 for the second subflow 240, the host 205 sends the packets on its shortest path to the host 210, i.e., the path via the router 215, the router 214, and the router 213. The subflows 235, 240 (as well as other subflows) are created and terminated at any time. Creation and termination of a subflow is similar to creation and termination of a TCP connection. Data can be sent over any of the subflows that currently compose the MPTCP connection. If a subflow fails, all the data that was transmitted over the failed subflow that has not yet been acknowledged will be retransmitted over other subflows.

The MPTCP techniques utilize TCP Options that are located at the end of TCP header and carry additional or optional information related to the associated TCP connections. In some embodiments, the TCP options shown in Table 1 are defined for exclusive use of MPTCP. These are collectively referred as "MPTCP Options".

TABLE 1

| Value | Symbol | Name |
| --- | --- | --- |
| 0x0 | M_CAPABLE | Multipath Capable |
| 0x1 | MP_JOIN | Join Connection |
| 0x2 | DSS | Data Sequence Signal (Data ACK and data sequence mapping) |
| 0x3 | ADD_ADDR | Add Address |
| 0x4 | REMOVE_ADDR | Remove Address |
| 0x5 | MP_PRIO | Change Subflow Priority |
| 0x6 | MP_FAIL | Fallback |
| 0x7 | MP_FASTCLOSE | Fast Close |
| 0xf | (PRIVATE) | Private Use within controlled testbeds |

Figure 3:
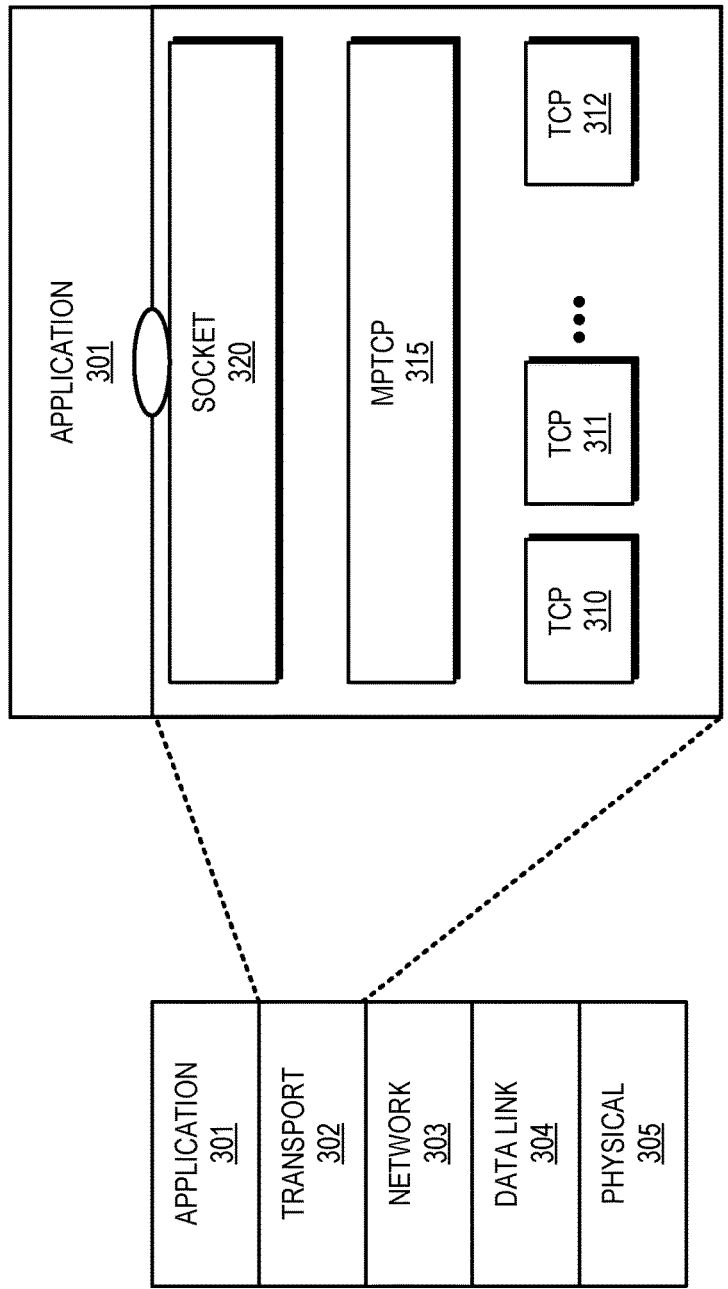
FIG. 3 is a block diagram of a layer stack that implements an MPTCP layer to hide subflows from applications according to some embodiments.

FIG. 3 is a block diagram of a layer stack 300 that implements an MPTCP layer to hide subflows from applications according to some embodiments. The layer stack 300 includes an application layer 301, a transport layer 302, a network layer 303, a data link layer 304, and the physical layer 305. Some embodiments of the layer stack 300 are implemented according to the Open Systems Interconnection (OSI) model, in which case the application layer 301 is deployed closest to the user to interact with software applications that implement a communications component, the transport layer 302 provides functional and procedural support for transferring variable-length data sequences from a source host to a destination host, the network layer 303 provides functional and procedural support for transmitting packets from one node to another connected in different networks, the data link layer 304 provides note-to-node data transfer over a link between two directly connected nodes, and the physical layer 305 performs transmission and reception of unstructured raw data between a device and a physical transmission medium.

In the illustrated embodiment, the transport layer 302 supports multiple TCP connections 310, 311, 312 (collectively referred to herein as "the TCP connections 310-312") and an MPTCP layer 315. The MPTCP layer 315 presents a single socket 320 to the application layer 301. The single socket 320 is implemented according to TCP so that any standard TCP application can be used above the MPTCP layer 315 while the MPTCP layer 315 spreads the data across the multiple subflows corresponding to the TCP connections 310-312. For example, the host 205 shown in FIG. 2 can open a socket with {TCP port 100, source IP address 10.11.12.13} on the first interface to the host 210 represented by {TCP port 200, IP address 20.21.22.23} on the third interface. The MPTCP layer 315 implemented at the host 205 also discovers the second interface {TCP port 100, source IP address 10.11.12.14} that can also be used to send packets to the host 210. The MPTCP layer 315 therefore automatically triggers the second subflow with the same TCP port 100 and the second interface. Thus, applications on the MPTCP connection remain agnostic of the underlying subflows.

Figure 4:
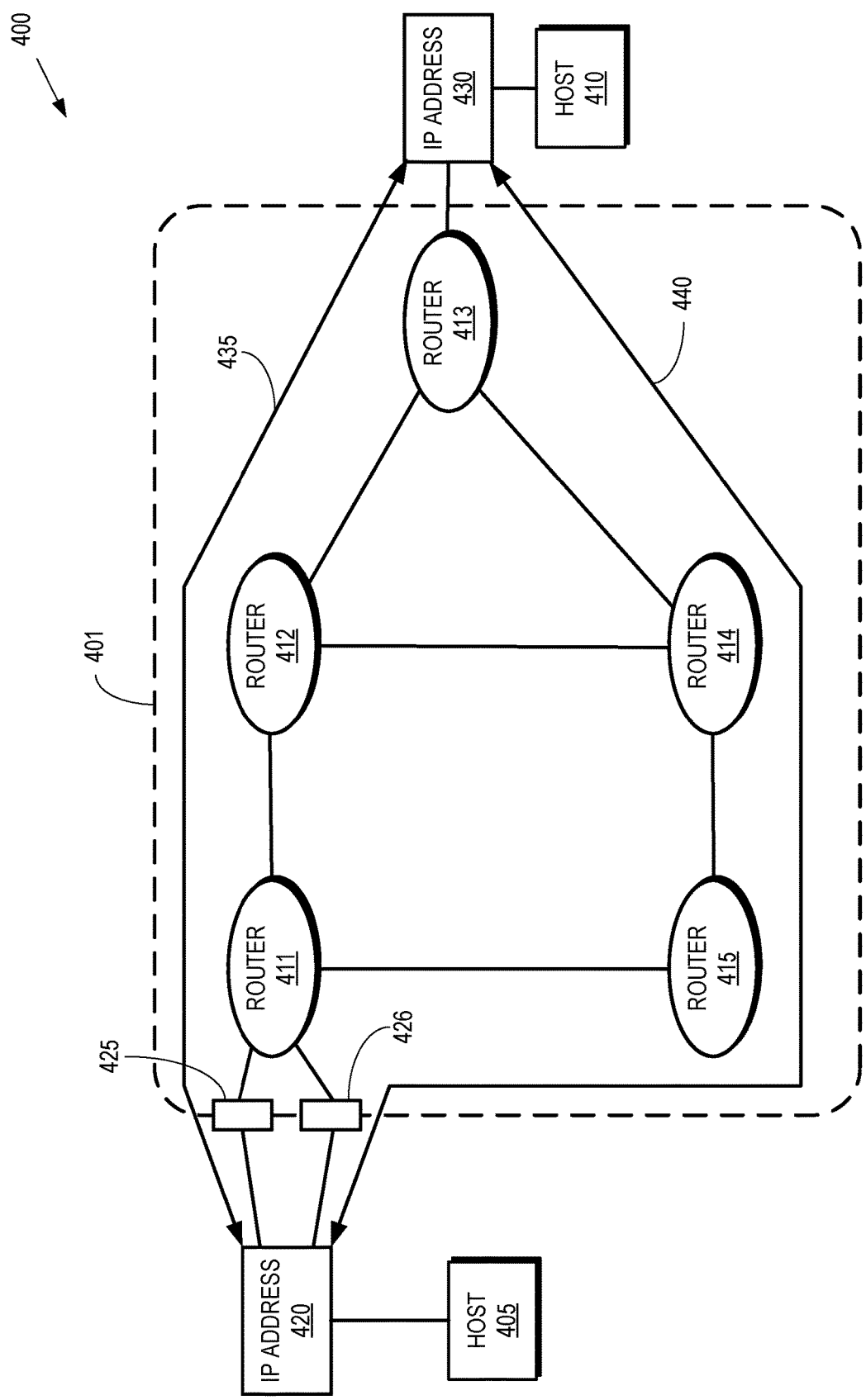
FIG. 4 is a block diagram of a communication system that includes a network to convey packets over multiple paths using a single-homed, single-addressed MPTCP connection according to some embodiments.

FIG. 4 is a block diagram of a communication system 400 that includes a network 401 to convey packets over multiple paths using a single-homed, single-addressed MPTCP connection according to some embodiments. The communication system 400 provides communication pathways to convey packets from a host 405 to a host 410 via a set of routers 411, 412, 413, 414, 415, which are collectively referred to herein as "the routers 411-415." In the illustrated embodiment, the host 405 is single-homed and single-addressed and uses the IP address 420 that has the value 10.11.12.13. The interface at the host 405 uses different ports—the source TCP port 100 (indicated by the reference numeral 425 in FIG. 4) and the source TCP port 101 (indicated by the reference numeral 426 and FIG. 4)—as identifiers of different intended paths through the network 401. The host 410 is single-homed and single-addressed and supports a single interface with the network 401 based on the IP address 430, which as the value 20.21.22.23. The host 410 uses the destination TCP port 200. As discussed herein, the routers 411-415 support multiple equal cost paths. In the illustrated embodiment, the equal cost multipath (ECMP) paths include a first path via the routers 411-413 and a second path via the routers 411, 415, 414, 413.

A first subflow 435 is established between the host 405 and the host 410 with {TCP port 100, IP address 10.11.12.13} on the interface at the host 405 and {TCP port 200, IP address 20.21.22.23} on the interface at the host 410. The host 405 uses TCP port 100 as the differentiator for the first subflow 435. In response to receiving TCP packets from the host 405 in the first subflow 435, the router 411 can choose between the first path and the second path to the host 410. The router 411 hashes on the four-tuple {Source IP address 10.11.12.13, Destination IP address 20.21.22.23, TCP source port 100, TCP destination port 200}, which results in mapping the packets in the first subflow 435 to the first path via the routers 411-413.

After establishing the first subflow 435, the host 405 establishes a second subflow 440 with {TCP port 101, IP address 10.11.12.13} on the interface with the host 405 and {TCP port 200, IP address 20.21.22.23} on the interface with the host 410. The host 405 uses TCP port 101 as a differentiator for the second subflow 440. The router 411 therefore hashes on the four-tuple {Source IP address 10.11.12.13, Destination IP address 20.21.22.23, TCP source port 100, TCP destination port 200} in response to receiving packets from the host 405 on the second subflow 440. The hashing of packets including the TCP port 100 in the four-tuple results in mapping the packets of the second subflow 440 to the second path via the routers 411, 415, 414, 413. The hosts 405, 410 are agnostic of availability of multiple paths in the network and may therefore set up more than two subflows 435, 440 on the MPTCP connection. In that case, the router 411 distributes the multiple subflows across the two paths.

Some embodiments of the techniques described herein with regard to FIG. 4 are also applicable when the host 405 is multi-homed but single-addressed, e.g., the host 405 uses a single loopback IP address in the MPTCP connection. Thus, the mechanism disclosed in FIG. 4 is applicable to any single-addressed MPTCP connection, irrespective of whether an endpoint is single-homed or multi-homed.

Figure 5:
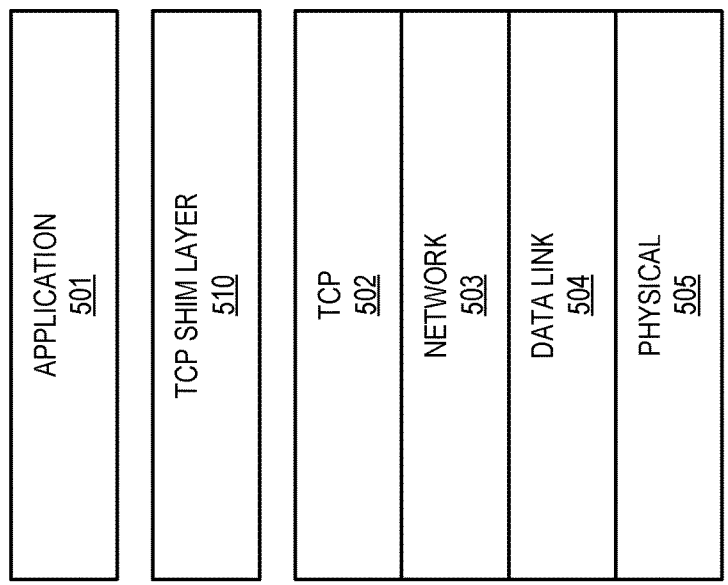
FIG. 5 is a block diagram of a layer stack that implements a TCP shim layer according to some embodiments.

FIG. 5 is a block diagram of a layer stack 500 that implements a TCP shim layer 510 according to some embodiments. The layer stack 500 includes an application layer 501, a transport layer 502, a network layer 503, a data link layer 504, and the physical layer 505. As discussed herein, some embodiments of the layer stack 500 are implemented according to the OSI model. The layer stack 500 also implements a TCP shim layer 510 between the application layer 501 and the TCP layer 502. Some embodiments of the TCP shim layer 510 act as an extension of the TCP layer 502 and perform corollary actions related to the TCP layer 502.

The TCP shim layer 510 carries a TCP Shim Header, which is sometimes referred to herein as an "actual ports shim header." A new TCP port number (referred to herein as a "shim port number" or a "TCP shim port number") is reserved to indicate the TCP Shim Header as the payload of a TCP packet. The destination port number in a TCP header is encoded with the shim port number. In some embodiments, the reserved value of the shim port number is equal to the value 275 in the IANA registry of port numbers. The source and destination port of the four-tuple that identifies a TCP connection is encoded in the TCP Shim Header. Endpoints are therefore free to use multiple source port numbers in the TCP header of a single TCP connection, which enables a router in the network to load balance the packets of the TCP connection across multiple paths. Each source port number is considered as an identifier of a "subflow" within the TCP connection. Unlike MPTCP, this is not a stateful subflow, so the subflows in TCP connections that are supported by the TCP shim layer do not need setup or termination of the subflow.

Using MPTCP to support load-balancing over multiple paths through a network generates several bottlenecks. For example, MPTCP adds significant code complexity to implementations to support subflow handling. Moreover, each subflow requires the same state maintenance as individual TCP connections. As a result of the additional complexity, not all endpoint systems support MPTCP, which reduces the scope of applicability of MPTCP because both the endpoints must support MPTCP for MPTCP to operate correctly, otherwise asymmetric endpoints fall back to using regular TCP. For another example, MPTCP implementations are prone to middlebox interference. Middlebox entities such as transparent TCP proxies, network address translation (NAT) in cellular networks and firewalls often remove MPTCP options in TCP Headers. The TCP Options are vulnerable to middlebox interference and if the TCP options are removed from the TCP headers the endpoints fall back to regular TCP. For yet another example, MPTCP implementations are difficult to debug. Some interfaces such as WiFi interfaces appear and disappear in mobile hosts. Some of these networks may have middleboxes that interfere with MPTCP, making subflow establishment impossible. Corner-case scenarios, which are hard to reproduce and only happen when a product is deployed at huge scale, require extensive logging mechanisms to trace the behavior of an MPTCP connection. Due to the uncertainties introduced by middleboxes on a network, it is very difficult to identify root cause of an issue. As a result, it is not always possible to differentiate between a software bug and a middlebox.

The TCP shim layer 510 addresses these drawbacks of MPTCP. For example, middleboxes such as firewalls and TCP proxies in the network treat each subflow as an independent TCP connection and the TCP Shim Header appears as part of the TCP payload created by the associated application. Thus, this approach is not susceptible to uncertainties or vulnerability from middleboxes that correctly interpret the TCP shim port number. In some embodiments, better security, intrusion protection, and the like are provided by a middlebox that is upgraded to operate according to the techniques disclosed herein. For example, middleboxes can be configured to parse the TCP shim header to obtain the actual source and destination TCP ports of the TCP connection in response to detecting a TCP packet with a destination port indicating the TCP Shim Header. The middlebox than constructs the 4-tuple that identifies the actual TCP connection.

Figure 6:
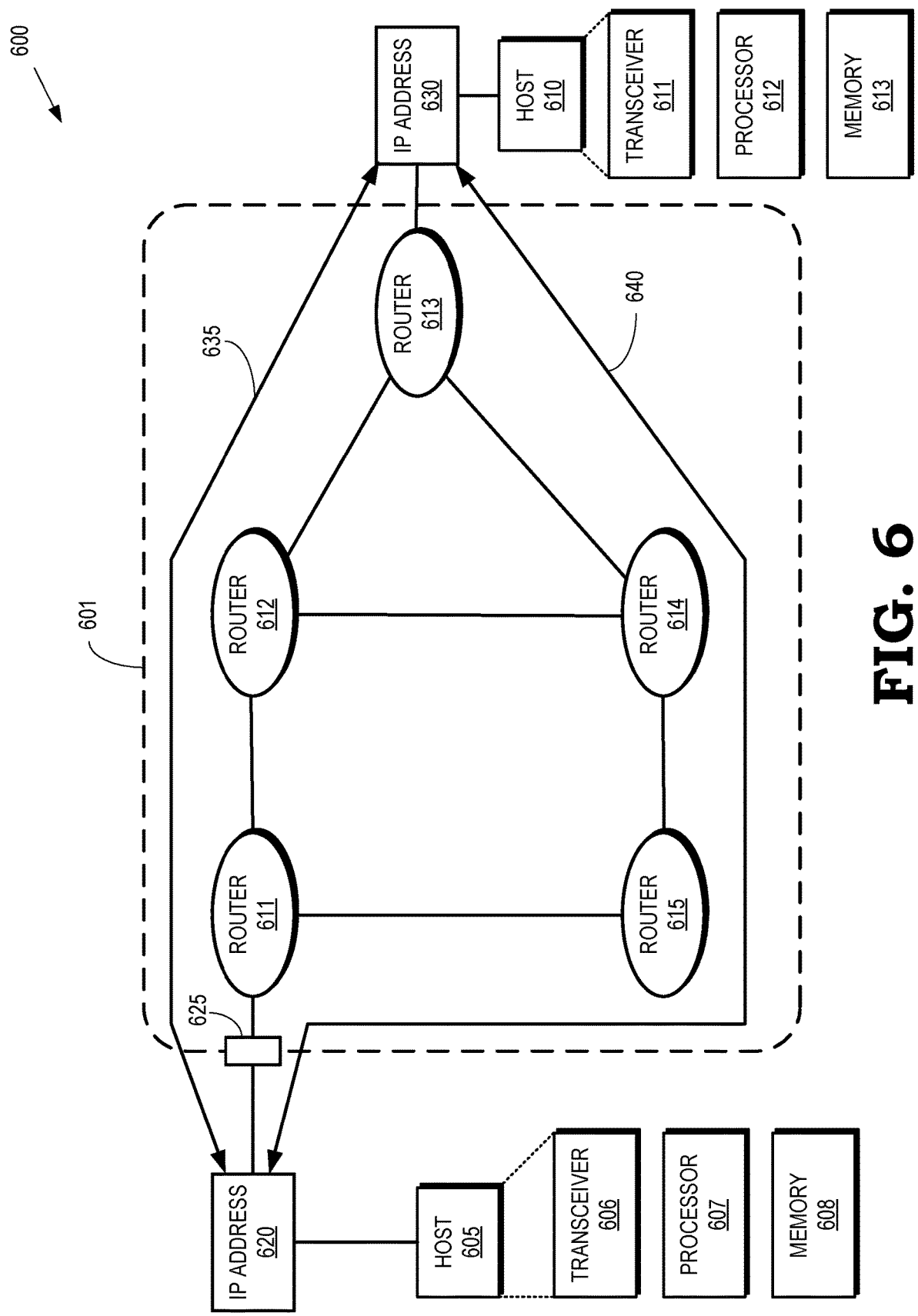
FIG. 6 is a block diagram of a communication system that performs load-balancing of a TCP connection across multiple paths through a network according to some embodiments.

FIG. 6 is a block diagram of a communication system 600 that performs load-balancing of a TCP connection across multiple paths through a network 601 according to some embodiments. The communication system 600 provides communication pathways to convey packets from a host 605 to a host 610 via a set of routers 611, 612, 613, 614, 615, which are collectively referred to herein as "the routers 611-615." The host 605 includes a transceiver 606 that supports communication with other entities in the network 601. The transceiver 606 may be implemented as a single integrated circuit (e.g., using a single ASIC or FPGA) or as a system-on-a-chip (SOC) that includes different modules for implementing the functionality of the transceiver 606. The host 605 also includes a processor 607 and a memory 608. The processor 607 executes instructions stored in the memory 608 and stores information in the memory 608 such as the results of the executed instructions. The host 610 includes a transceiver 611 that supports communication with other entities in the network 601. The transceiver 611 may be implemented as a single integrated circuit (e.g., using a single ASIC or FPGA) or as a system-on-a-chip (SOC) that includes different modules for implementing the functionality of the transceiver 611. The host 610 also includes a processor 612 and a memory 613. The processor 612 executes instructions stored in the memory 613 and stores information in the memory 613 such as the results of the executed instructions.

In the illustrated embodiment, the host 605 is single-homed and single-addressed and uses the IP address 620 that has the value 10.11.12.13. The interface at the host 605 uses a source TCP port 100 (indicated by the reference numeral 625 in FIG. 6). The host 610 is single-homed and single-addressed and supports a single interface with the network 601 based on the IP address 630, which as the value 20.21.22.23. The host 610 uses the destination TCP port 200. As discussed herein, the routers 611-615 support multiple equal cost paths. In the illustrated embodiment, the equal cost multipath (ECMP) paths include a first path via the routers 611-613 and a second path via the routers 611, 615, 614, 613.

The host 605 establishes a TCP connection to the host 610 with the endpoint identifiers {TCP port 100, IP address 10.11.12.13} on the interface to the host 605 and {TCP port 200, IP address 20.21.22.23} on the interface to the host 610. To establish the TCP connection, the host 605 creates the state for a TCP connection with the four-tuple {Source IP address=10.11.12.13, Destination IP address=20.21.22.23, TCP Source port=100, TCP destination port=200}. The host 605 selects a subflow identifier (1) for a first subflow 635 of the TCP connection. The subflow identifier is used as a source port number in a SYN packet. The destination port number for the SYN packet is set equal to a reserved value that indicates the TCP shim header. The host 605 transmits the SYN packet to the host 610 with a TCP Header={source port=1, destination port=TCP-Shim} and a TCP Shim Header={source port=100, destination port=200}.

In response to receiving the SYN packet, the host 610 identifies the destination port in the TCP Header as the reserved value TCP-Shim. The host 610 therefore reads the TCP Shim Header to determine the source port and destination port of the TCP connection and builds the four-tuple for the TCP connection. The host 610 creates the TCP connection with four-tuple:
{Source IP address=20.21.22.23, Destination IP address=10.11.12.13, TCP Source Port=200, TCP Destination port=100}.

Note that source and destination fields are reversed at the host 610, relative to their positions at the host 605.

The host 610 selects a subflow identifier (10) for inclusion in a SYN-ACK packet. The host 610 then transmits the SYN-ACK packet to the host 605 with a TCP Header={source port=10, destination port=TCP-Shim} and a TCP Shim Header={source port=200, destination port=100}. In response to receiving the SYN-ACK packet, the host 605 identifies the destination port in TCP Header as the reserved value TCP-Shim. The host 605 therefore reads the TCP Shim Header for the source port and destination port of the TCP connection and builds the four-tuple. The host 605 identifies the pending connection with four-tuple:
{Source IP address=10.11.12.13, Destination IP address=20.21.22.23, TCP Source Port=100, TCP Destination port=200}

The host 605 sends an ACK packet to the host 610 with TCP Header={source port=1, destination port=TCP-Shim} and TCP Shim Header={source port=100, destination port=200}. At this point, the TCP three-way handshake is complete and the TCP connection is operational.

Once the TCP connection is operational, the host 605 can send TCP packets on the TCP connection with TCP Header={source port=any, destination port=TCP-Shim} and TCP Shim Header={source port=100, destination port=200}. For example, if the host 605 is going to establish a number (N) of ECMPs in the network 601, then the host 605 allocates a source port value in the TCP header of subsequent packets in a round-robin manner in the range 1 ... N. The host 610 independently enables load balancing of packets transmitted to the host 605 via the network 601.

For example, the host 605 may alternate between source port values of 1 and 2 in the TCP headers of a sequence of packets that are transmitted to the host 610 via the first subflow 635 and a second subflow 640. Routers such as the router 611 identify multiple ECMP for the packets being transmitted from the host 605 to the host 610 via the TCP connection. The router 611 therefore hashes on the four-tuple {source IP address in IP Header, destination IP address in IP header, source port in TCP Header, destination port in TCP header} in the packets. The packets transmitted by the host 605 differ only with respect to the value of the source port in the TCP header and approximately half the packets receive the source port value of 1 and the other half of the packets receive the source port value of 2. Consequently, the router 611 load balances the packets substantially equally across the two ECMPs.

Packets can be load balanced over subflows of a TCP connection to multi-homed, singled-addressed hosts. For example, an endpoint could be a router that uses a loopback IP address for the TCP connection and the router is multi-homed to the network through multiple interfaces.

Figure 7:
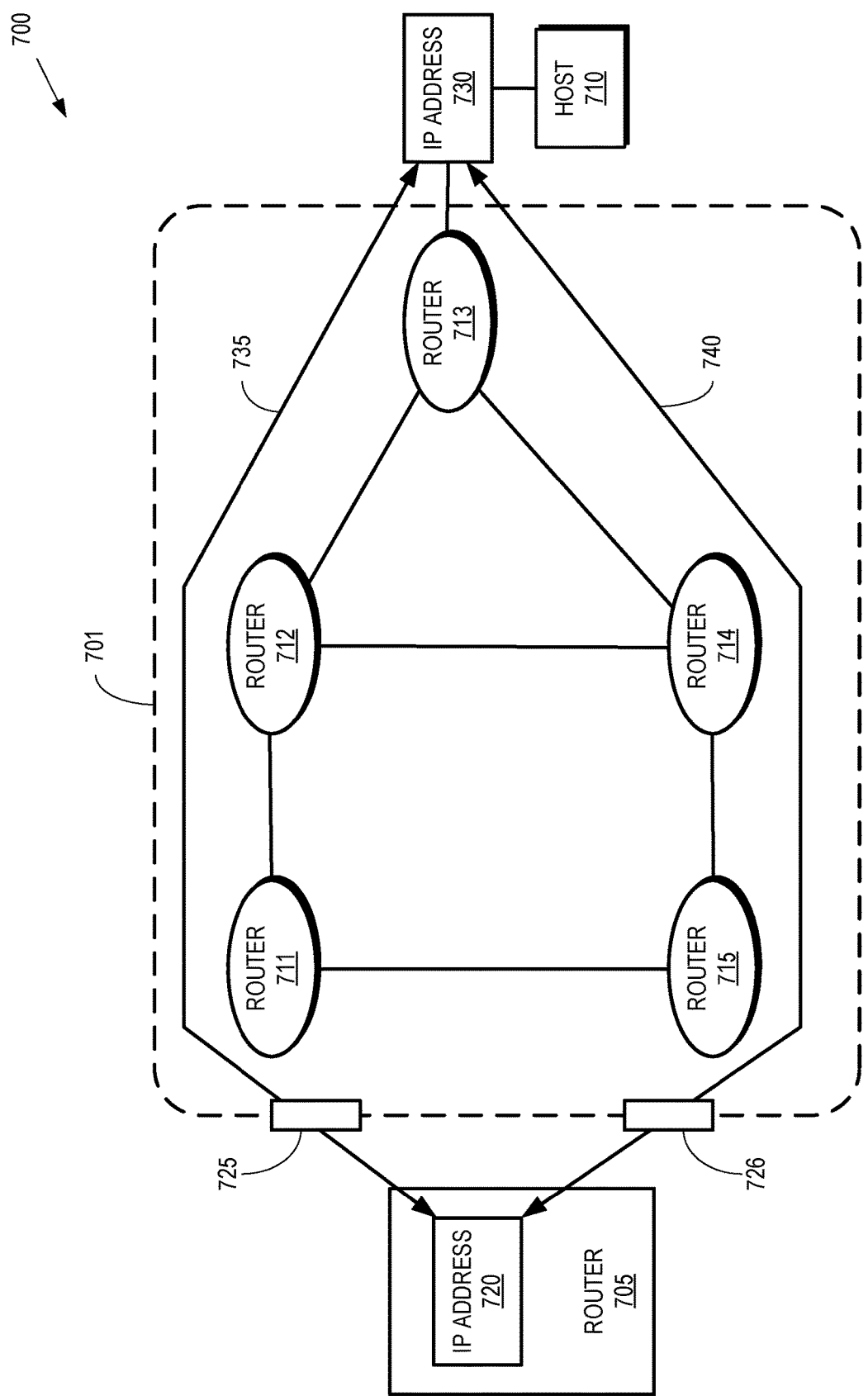
FIG. 7 is a block diagram of a communication system that performs load-balancing of a multi-homed, single-addressed TCP connection across multiple paths through a network according to some embodiments.

FIG. 7 is a block diagram of a communication system 700 that performs load-balancing of a multi-homed, single-addressed TCP connection across multiple paths through a network 701 according to some embodiments. The communication system 700 provides communication pathways to convey packets from a host router 705 to a host 710 via a set of routers 711, 712, 713, 714, 715, which are collectively referred to herein as "the routers 711-715." In the illustrated embodiment, the host router 705 is single-addressed and uses the loopback IP address 720 that has the value 10.11.12.13 with the TCP port 100. The host router 705 is also multi-homed to the network 701 through the interfaces 725, 726. The host 710 is single-homed and single-addressed and supports a single interface with the network 701 based on the IP address 730, which as the value 20.21.22.23. The host 710 uses the destination TCP port 200. As discussed herein, the routers 711-715 support multiple equal cost paths. In the illustrated embodiment, the equal cost multipath (ECMP) paths include a first path via the routers 711-713 and a second path via the routers 711, 715, 714, 713.

In the illustrated embodiment, the host router 705 sets up two subflows 735, 740 in the TCP connection. Packets for the first subflow 735 are sent over the first path with TCP Header={source port=1, destination port=TCP-Shim} and TCP Shim Header={source port=100, destination port=200}. Packets for the second subflow 740 are sent over the second path with TCP Header={source port=2, destination port=TCP-Shim} and TCP Shim Header={source port=100, destination port=200}.

Figure 8:
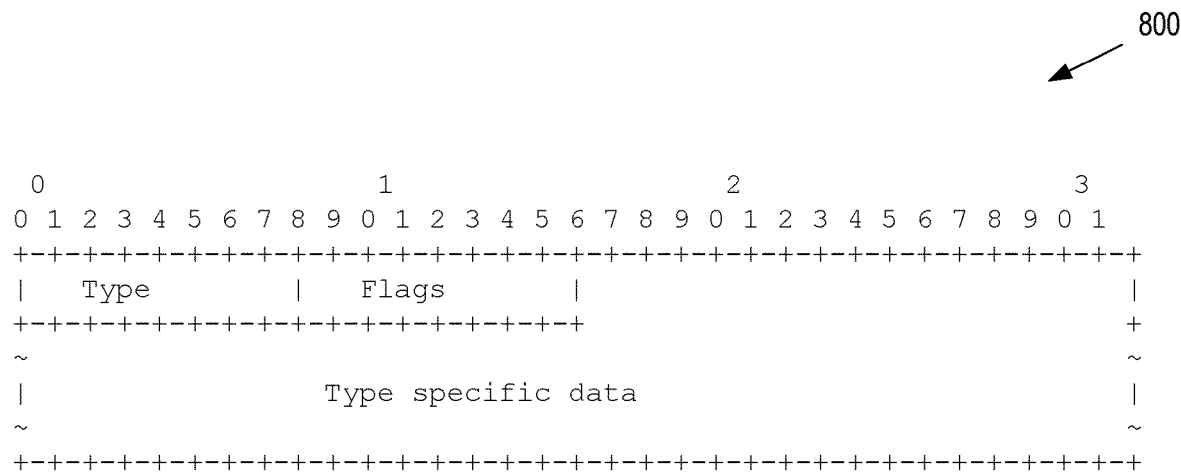
FIG. 8 illustrates an example format of a TCP shim header according to some embodiments.

FIG. 8 illustrates an example format of the TCP shim header 800 according to some embodiments. The TCP shim header 800 is inserted between a TCP Header and application data. If a session layer is present between TCP and application data, such as TLS (Transport Layer Security) or SSL (Secured Socket Layer), then the TCP shim header 800 is inserted between the TCP header and session layer header.

The fields in the TCP shim header 800 are as follows:
Type: This 8-bit field indicates the type of TCP Shim Header. Some embodiments of the type are defined as follows:
0x1=Actual Ports Shim Header.
Flags: This 8-bit fields contains various flags that characterize some directives of the TCP shim header 800.
Embodiments describe herein do not use any flags, so sender sets this field to 0 and receiver should ignore this field.
Type specific data: This field contain the data as per the Type.

Figure 9:
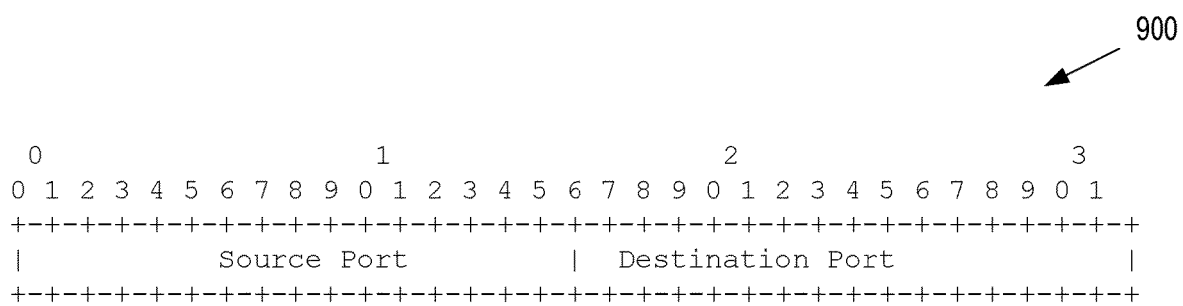
FIG. 9 illustrates an example format for type specific data in the actual ports shim header according to some embodiments.

FIG. 9 illustrates an example format 900 for type specific data in the actual ports shim header according to some embodiments. The fields in the example format 900 include:
Source Port: The actual source port of the TCP packet in the connection.
Destination Port: The actual destination port of the TCP packet in the connection.

Figure 10:
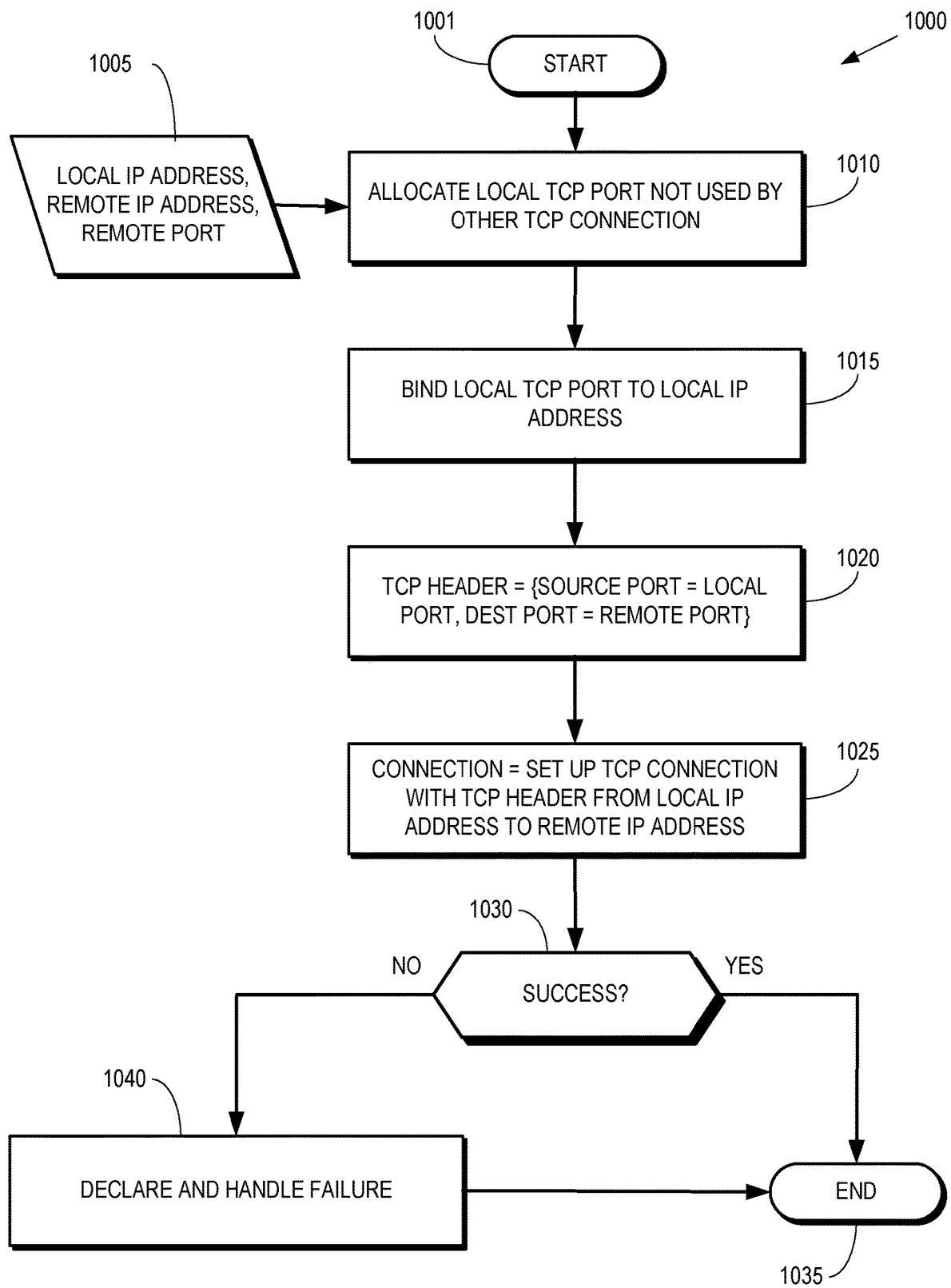
FIG. 10 is a flow diagram of a method of setting up a conventional TCP connection.

FIG. 10 is a flow diagram of a method 1000 of setting up a conventional TCP connection. The method 1000 begins at the block 1001. The method 1000 receives input 1005 including a Local IP address that used by the client for the TCP connection, a Remote IP address of the server to which the TCP connection is to be made, and a Remote Port, which is the TCP port number in the server indicating application or payload type of the TCP connection.

At block 1010, a local TCP port that is not used by any other TCP connection is allocated to the current TCP connection. At block 1015, the local TCP port is bound to the local IP address as the endpoint identifier of the client in the TCP connection. Thus, the local IP address and the local TCP port form the local half of the four-tuple associated with the TCP connection.

At block 1020, a local host creates a TCP header including a source port field that includes the local port and a destination port field that encodes the remote port. The TCP header is added to a packet for transmission to the destination. In some embodiments, other parameters in the TCP header are encoded to indicate that the packet is a TCP SYN packet. At block 1025, the local host sets up the TCP connection and transmits the packet to a remote IP address, e.g., in the form of a TCP SYN packet.

At decision block 1030, the local host determines whether the connection request succeeded. In some embodiments, the local host determines that the connection request succeeded by receiving a SYN-ACK packet from the remote IP address and transmitting an ACK packet back to the remote IP address, thereby completing the 3-way handshake. The remote endpoint of the connection is identified with {Remote IP address, Remote port}, which forms the remote half of the four-tuple. If the connection request succeeded, the method 1000 flows to block 1035 and the method 1000 ends. If the connection request failed, the method 1000 flows to the block 1040 and the local host declares failure to set up the connection and performs required handling. The method 1000 then flows to the block 1035 and the method 1000 ends.

Figure 11:
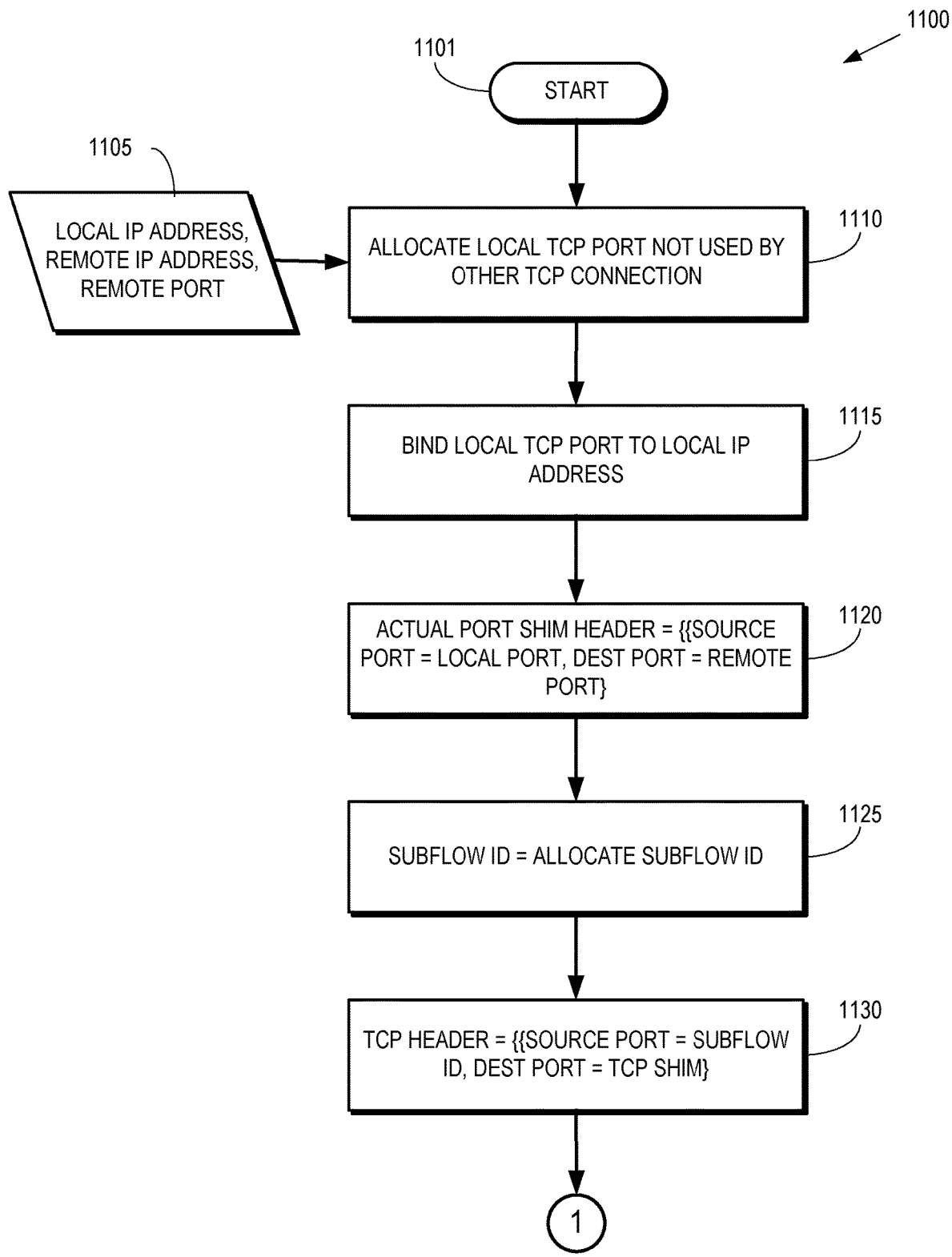
FIG. 11 is a flow diagram of a first portion of a method of setting up a TCP connection that load balances over multiple paths associated with multiple subflows according to some embodiments.

FIG. 11 is a flow diagram of a first portion of a method 1100 of setting up a TCP connection that load balances over multiple paths associated with multiple subflows according to some embodiments. The method 1100 is implemented in some embodiments of the communication system 600 shown in FIG. 6 and the communication system 700 shown in FIG. 7.

The method 1100 begins at the block 1101. The method 1100 receives input 1105 including a Local IP address that used by the client for the TCP connection, a Remote IP address of the server to which TCP connection is to be made, and a Remote Port, which is the TCP port number in the server indicating application or payload type of the TCP connection.

At block 1110, a local TCP port that is not used by any other TCP connection is allocated to the current TCP connection. At block 1115, the local TCP port is bound to the local IP address as the endpoint identifier of the client in the TCP connection. Thus, the local IP address and the local TCP port form the local half of the four-tuple associated with the TCP connection.

At block 1120, the local host creates a packet with the actual ports shim header that includes a source port field including the local port and the destination port field encoding the remote port. At block 1125, the local host allocates a subflow identifier that is used to transmit a connection request. In some embodiments, custom criteria are used to determine the value of the subflow identifier.

At block 1130, the local host pushes the TCP header onto the packet. The TCP header includes a source port field encoding the subflow identifier and a destination port field encoding a port number that is reserved to indicate the use or presence of a TCP shim header. In some embodiments, the TCP header includes other parameters that indicate that the packet is a TCP SYN packet. The method 1100 then flows to the node 1, which connects to the block 1205 in FIG. 12.

Figure 12:
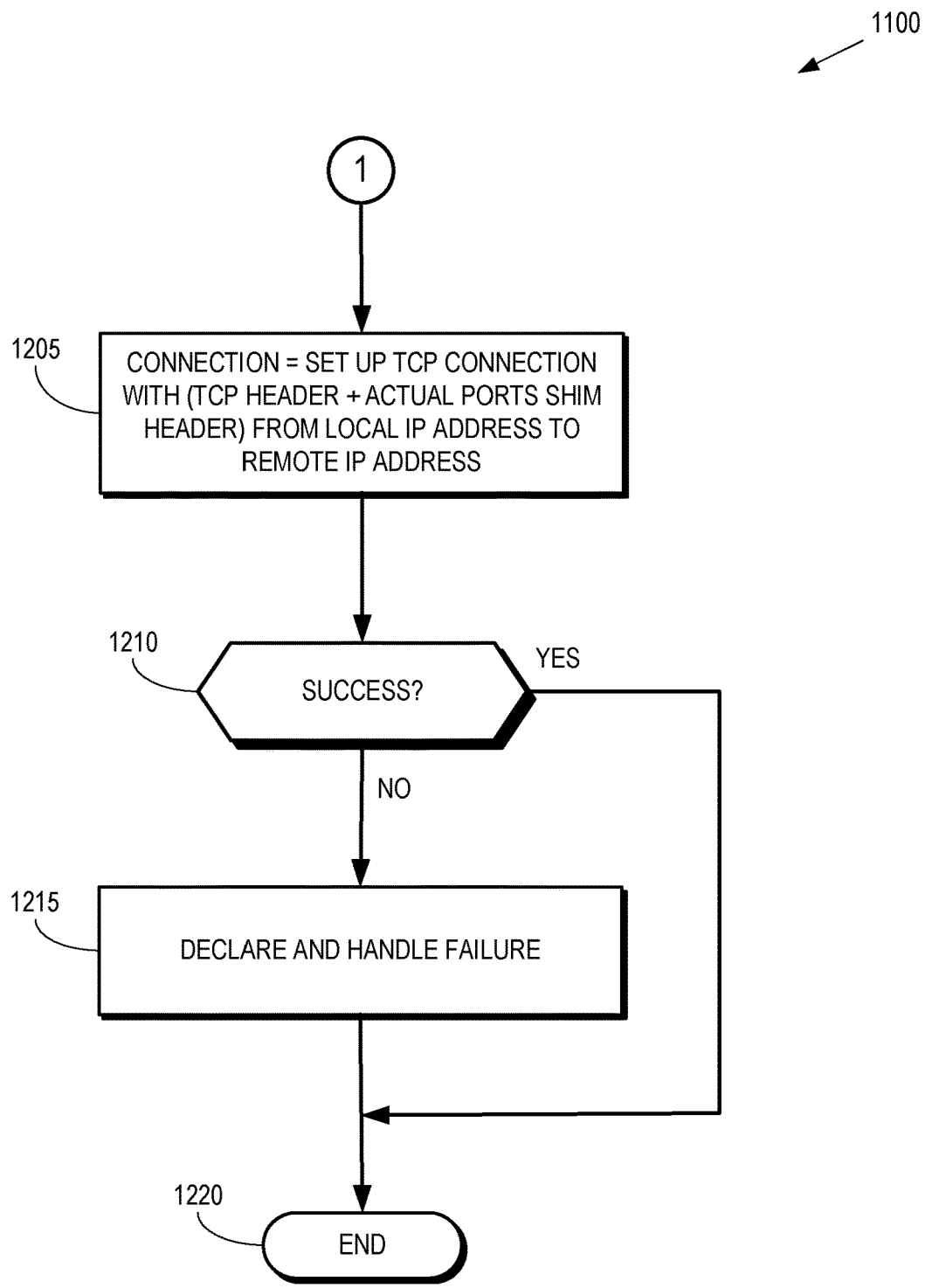
FIG. 12 is a flow diagram of a second portion of the method of setting up the TCP connection that load balances over multiple paths associated with multiple subflows according to some embodiments.

FIG. 12 is a flow diagram of a second portion of the method 1100 of setting up the TCP connection that load balances over multiple paths associated with multiple subflows according to some embodiments. The block 1205 is connected to the block 1130 in FIG. 11 via the node 1.

At block 1205, the local host sets up the TCP connection from the local host to a remote IP address based on the TCP header and the actual ports shim header. The local host then sends a TCP SYN packet to the remote IP address via the TCP connection.

At decision block 1210, the local host determines whether the connection request succeeded. In some embodiments, the local host determines that the connection request succeeded by receiving a SYN-ACK packet from the remote IP address and transmitting an ACK packet back to the remote IP address, thereby completing the 3-way handshake. The remote endpoint of the connection is identified with {Remote IP address, Remote port}, which forms the remote half of the four-tuple. If the connection request succeeded, the method 1100 flows to block 1215 and the method 1100 ends. If the connection request failed, the method 1100 flows to the block 1220 and the local host declares failure to set up the connection and performs required handling. The method 1100 then flows to the block 1215 and the method 1100 ends.

Figure 13:
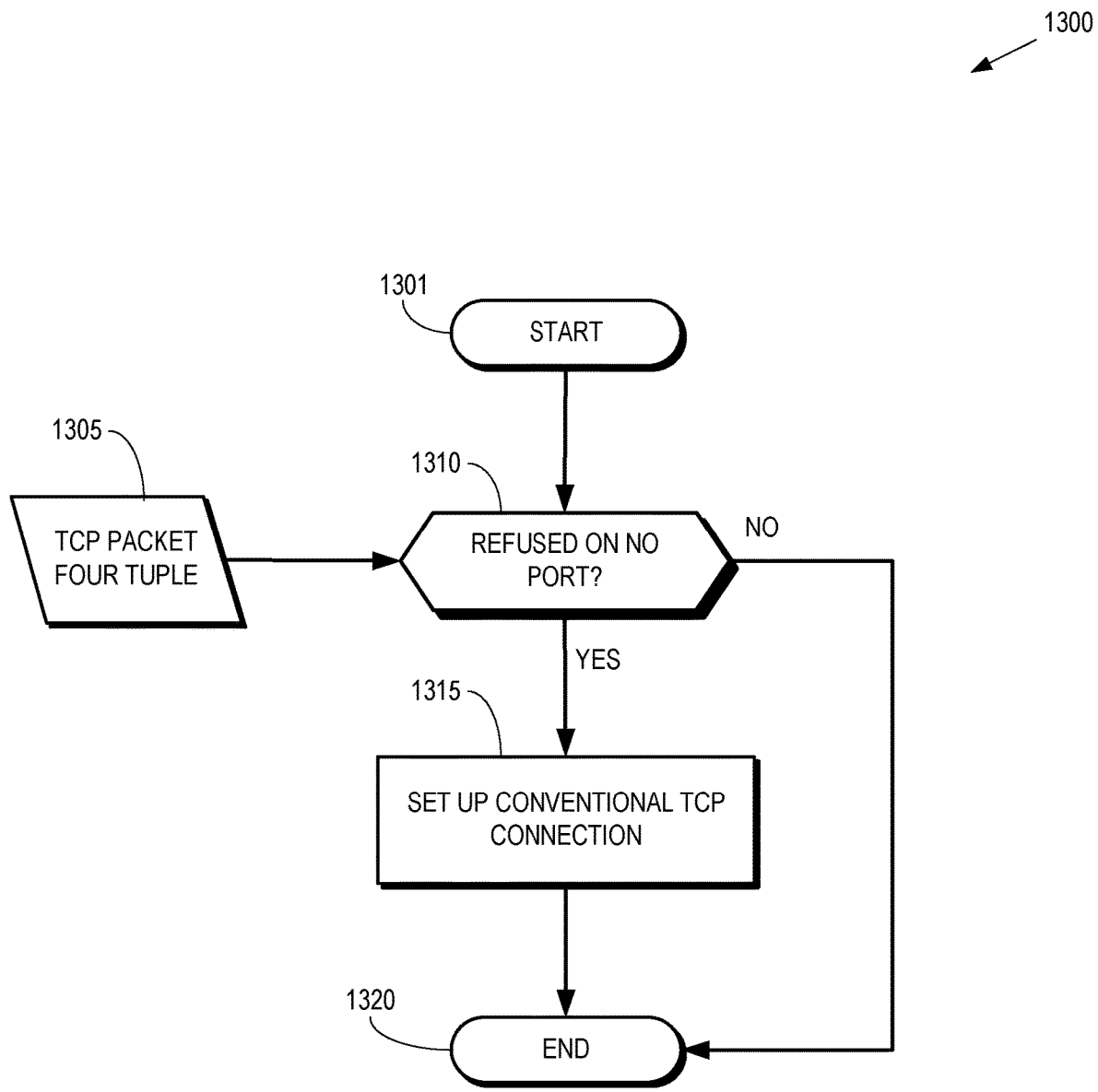
FIG. 13 is a flow diagram of a method of declaring and handling failure to set up a TCP connection that supports multiple subflows according to some embodiments.

FIG. 13 is a flow diagram of a method 1300 of declaring and handling failure to set up a TCP connection that supports multiple subflows according to some embodiments. Some embodiments of the method 1300 are used to implement block 1215 in FIG. 12.

The method 1300 begins at the block 1301. The method 1300 receives input 1305 including a TCP packet that conveyed the connection rejection notification and a four-tuple that identifies the TCP connection that was rejected.

At block 1310, the local host determines whether the rejection notification in the TCP packet indicates that refusal of the TCP connection is due to a TCP shim port not being open in the remote IP address indicated in the destination IP address of the four-tuple. If so, which indicates that the remote IP address does not support TCP connections having multiple subflows, the method 1300 flows to block 1315 and the local host configures a conventional TCP connection (e.g., a TCP connection that does not support multiple subflows) from the local IP address to the remote port in the remote IP address indicated in the four-tuple. The method 1300 then flows to block 1320 and the method 1300 terminates. If the local host determines that the rejection notification was not due to a TCP shim port not being open, the method 1300 flows to block 1320 and the method 1300 terminates.

Figure 14:
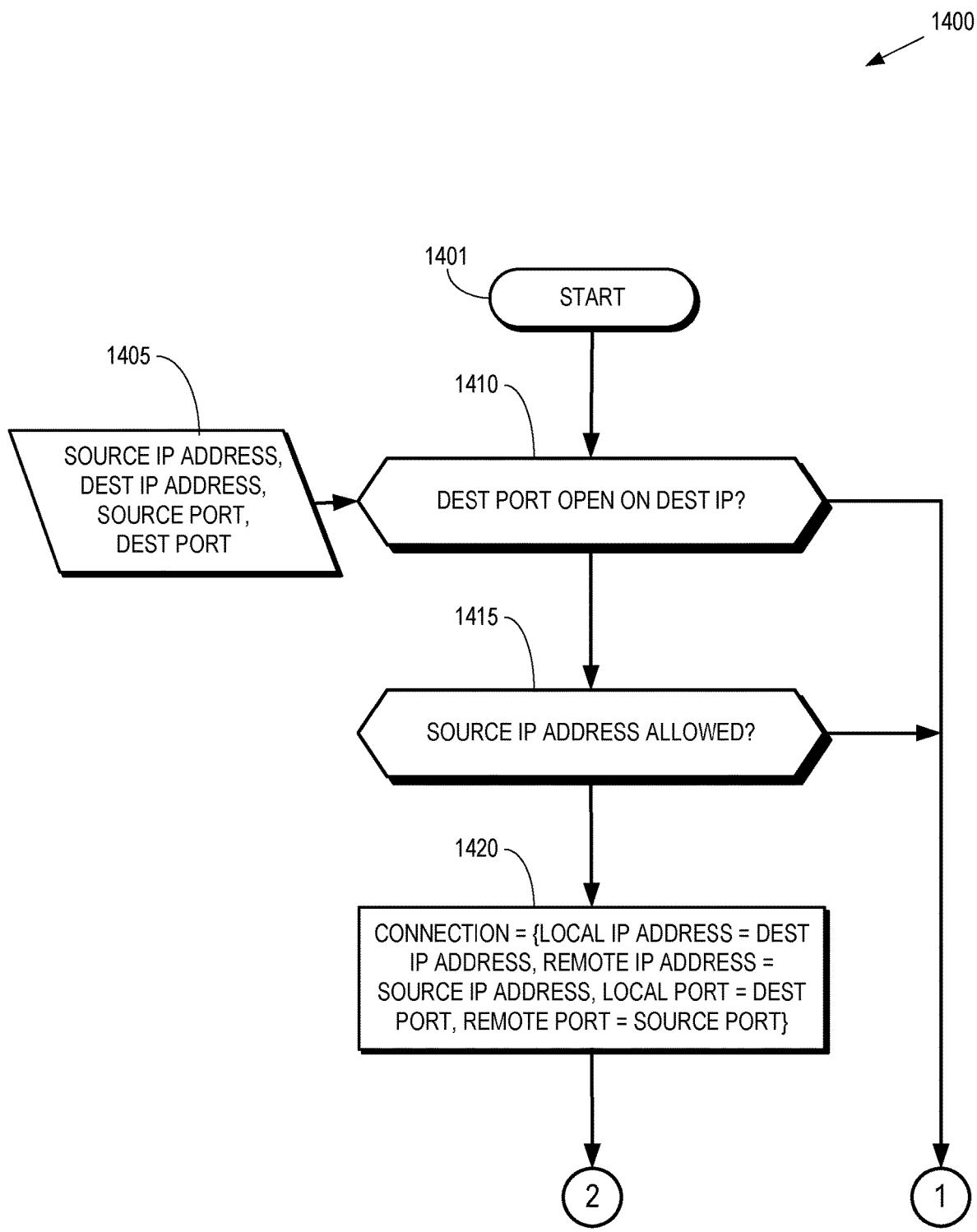
FIG. 14 is a flow diagram of a first portion of a method of a conventional technique of processing incoming TCP connection requests at a server.

FIG. 14 is a flow diagram of a first portion of a method 1400 of a conventional technique of processing incoming TCP connection requests at a server. The method 1400 begins at the block 1401. The method 1400 receives input 1405 including a source IP address of the client that transmitted the request, a destination IP address that is the local IP address of the server, a source TCP port for the connection at the client, and a destination TCP port at the server that receives the request to establish the TCP connection with the client.

At decision block 1410, the server determines whether the destination port is open in TCP. If so, the method 1400 flows to decision block 1415. Some embodiments of the client implement the TCP shim layer and in that case the destination port would be the TCP shim port, which is unknown to the TCP server. The method 1400 would therefore flow to the node 1. If the destination port is not open, the method 1400 flows to the node 1.

At decision block 1415, the server determines whether a connection is allowed from the source IP address. If the connection is not allowed, the method 1400 flows to the node 1. If the connection is allowed, the method 1400 flows to the block 1420 and the server accepts the TCP connection request. In response to accepting the TCP connection request, the server creates the state for the TCP connection with the 4-tuple {Local IP Address=Destination IP Address, Remote IP Address=Source IP Address, Local Port=Destination port, Remote Port=Source port}. The method 1400 then flows to the node 2.

Figure 15:
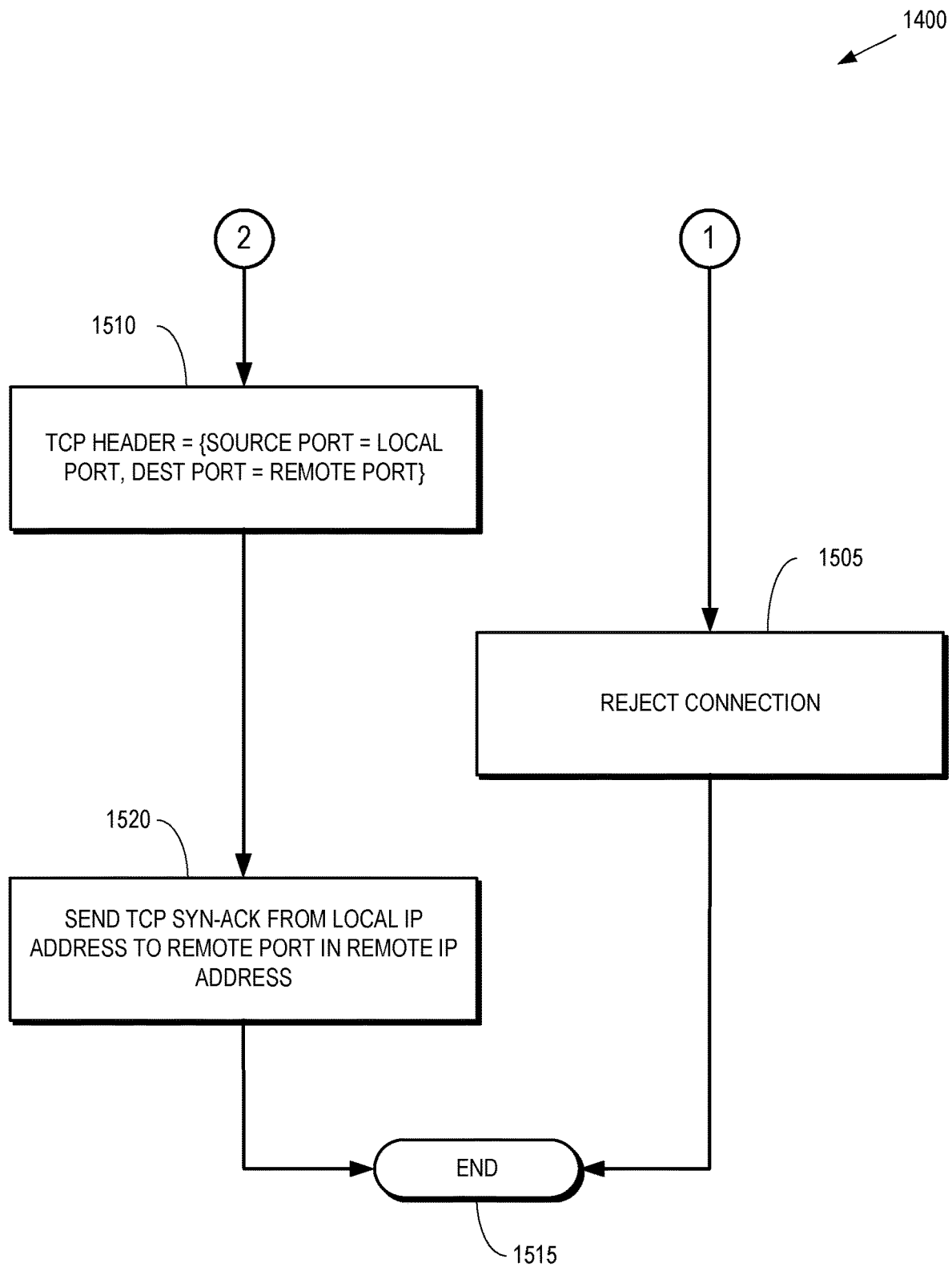
FIG. 15 is a flow diagram of a second portion of the method of the conventional technique of processing incoming TCP connection requests at a server.

FIG. 15 is a flow diagram of a second portion of the method 1400 of the conventional technique of processing incoming TCP connection requests at a server. The block 1505 in FIG. 15 is connected to the decision block 1410, 1415 in FIG. 14 via the node 1. The block 1510 in FIG. 15 is connected to the block 1420 in FIG. 14 via the node 2.

At block 1505, the TCP connection request is rejected by the server. In some embodiments, the server transmits a rejection notification to the client using a TCP RST packet. The method 1400 then flows to the block 1515 and the method 1400 ends.

At block 1510, the server generates a TCP Header with Source Port=Local Port and Destination Port=Remote Port. At block 1520, the server transmits the packet with the TCP header to the client has an acknowledgment packet. In some embodiments, other fields in the TCP header are encoded to indicate a SYN-ACK packet. The method 1400 then flows to the block 1515 and the method 1400 ends.

Figure 16:
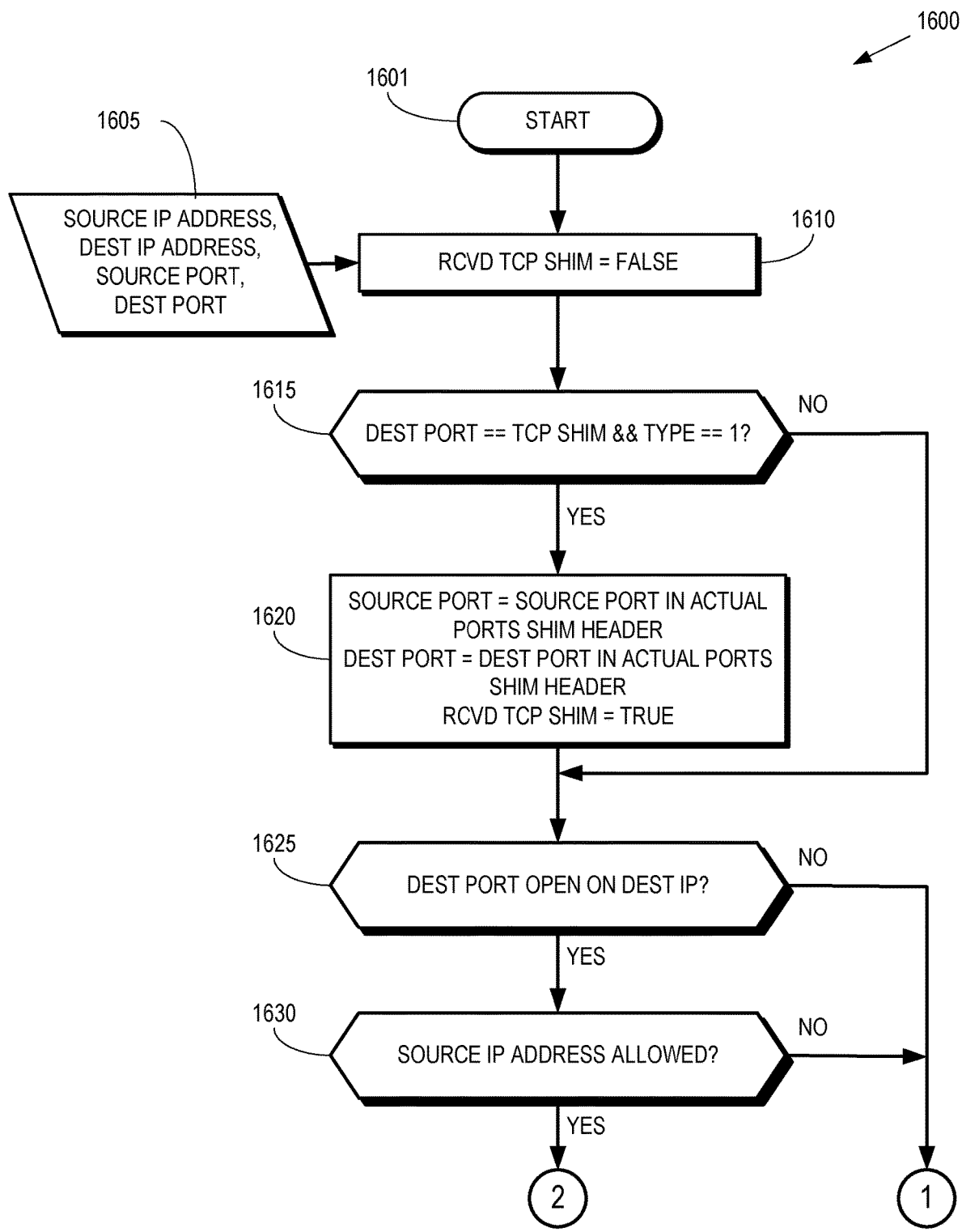
FIG. 16 is a flow diagram of a first portion of a method of processing incoming TCP connection requests including a TCP shim header at a server according to some embodiments.

FIG. 16 is a flow diagram of a first portion of a method 1600 of processing incoming TCP connection requests including a TCP shim header at a server according to some embodiments. The method 1600 is implemented in some embodiments of the communication system 600 shown in FIG. 6 and the communication system 700 shown in FIG. 7.

The method 1600 begins at the block 1601. The method 1600 receives input 1605 including a source IP address of the client that transmitted the request, a destination IP address that is the local IP address of the server, a source TCP port for the connection at the client, and a destination TCP port at the server that receives the request to establish the TCP connection with the client.

At block 1610, the server sets a value of a local variable "Rcvd TCP shim" to false. The local variable tracks whether a connection request includes a TCP shim header. At decision block 1615, the server determines whether the destination port has a value that indicates a TCP shim header and, if so, whether the TCP shim header has a type of 1 that indicates an actual ports shim header. If so, the method 1600 flows to the block 1620. If not, the method 1600 flows to the decision block 1625.

At block 1620, the server reads the source port and destination port fields in the actual ports shim header and overrides the respective input values that were received from the TCP header. The value of the local variable "Rcvd TCP shim" is set to true to indicate that a TCP shim header has been received.

At decision block 1625, the server determines whether a destination port is open in TCP. If not, the method 1600 flows to the node 1, which connects to the block 1805 in FIG. 18. If a destination port is open in TCP, the method 1600 flows to the decision block 1630.

At decision block 1630, the server determines whether a connection is allowed from the source IP address. If so, the method 1600 flows to the node 2, which connects to the block 1705 in FIG. 17. If a connection is not allowed from the source IP address, the method 1600 flows to the node 1, which connects to the block 1805 in FIG. 18.

Figure 17:
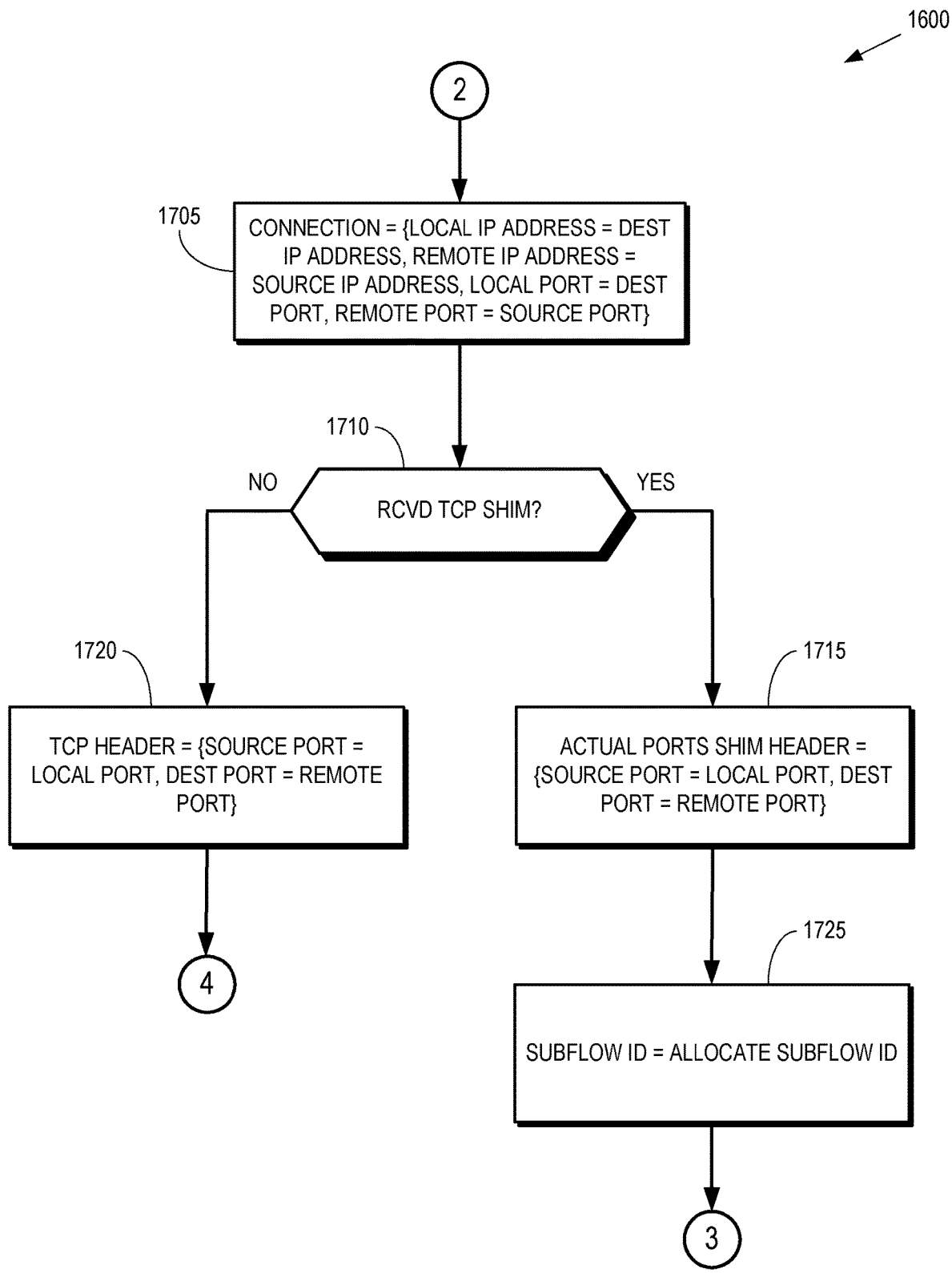
FIG. 17 is a flow diagram of a second portion of the method of processing incoming TCP connection requests including the TCP shim header at the server according to some embodiments.

FIG. 17 is a flow diagram of a second portion of the method 1600 of processing incoming TCP connection requests including the TCP shim header at the server according to some embodiments. The block 1705 connects to the "Yes" branch from the decision block 1630 in FIG. 16.

At block 1705, the server accepts the TCP connection request. Accepting the TCP connection request includes creating the state for the TCP connection including the four-tuple {Local IP Address=Destination IP Address, Remote IP Address=Source IP Address, Local Port=Destination port, Remote Port=Source port}.

At decision block 1710, the server determines whether the connection request was received with an actual ports shim header. If so, the method 1600 flows to the block 1715. Otherwise, the method 1600 flows to the block 1720.

At block 1715, the server creates a packet including the actual ports shim header that encodes the source port as the local port and the destination port is encoded as a remote port. At block 1725, the server allocates a subflow identifier that is used to send the response to the client. In some embodiments, custom criteria are used to determine the value of the subflow identifier, e.g., randomly selecting subflow identifiers from a set of subflow identifiers, incrementing values of the subflow identifiers by a predetermined step interval from a previously allocated subflow identifier, and the like. The method 1600 then flows to the node 3, which connects to the block 1810 in FIG. 18.

At block 1720, the server creates a packet with a TCP header that encodes the source port as the local port and the destination port as the remote port. The method 1600 then flows to the node 4, which connects to the block 1815 in FIG. 18.

Figure 18:
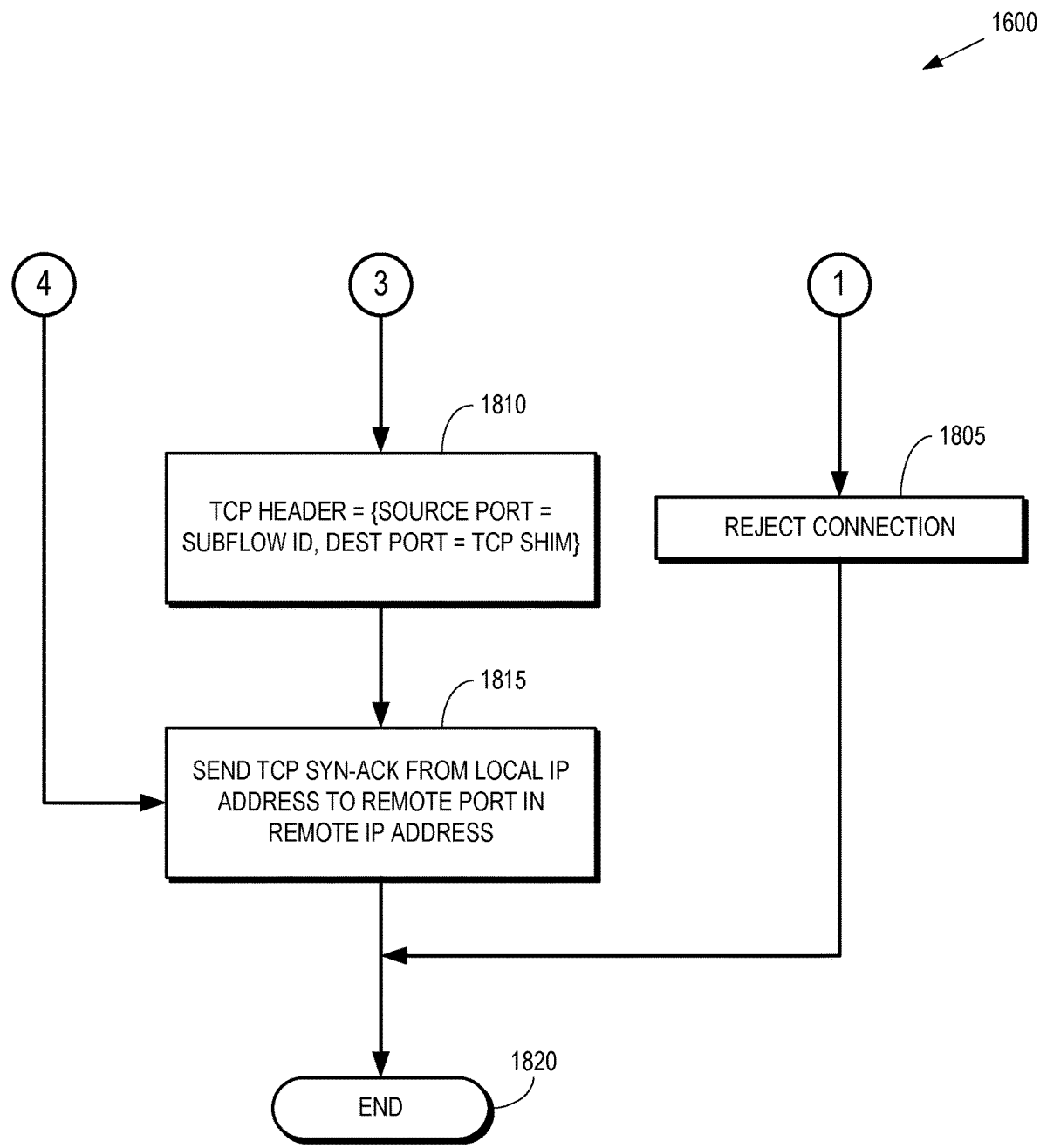
FIG. 18 is a flow diagram of a third portion of the method of processing incoming TCP connection requests including the TCP shim header at the server according to some embodiments.

FIG. 18 is a flow diagram of a third portion of the method 1600 of processing incoming TCP connection requests including the TCP shim header at the server according to some embodiments. The block 1805 connects to the "No" branches from the decision blocks 1625, 1630 in FIG. 16. The block 1810 connects to the block 1725 in FIG. 17 and the block 1815 connects to the block 1720 in FIG. 17.

At block 1805, the server rejects the connection request for the TCP connection. In some embodiments, the server transmits a rejection notification to the client such as a TCP RST packet. The method 1600 then flows to the block 1820 and the method 1600 ends.

At block 1810, the server pushes the TCP header onto the packet. The source port field in the TCP packet encodes the subflow identifier and the destination port field encodes the reserved port number that indicates the TCP shim layer. In some embodiments, other parameters in the TCP header are encoded to indicate that the packet is a TCP SYN packet.

At block 1815, the server transmits the packet including the TCP header (such as a TCP SYN packet) from the local IP address to the remote IP address. The method 1600 then flows to block 1820 and the method 1600 ends.

Figure 19:
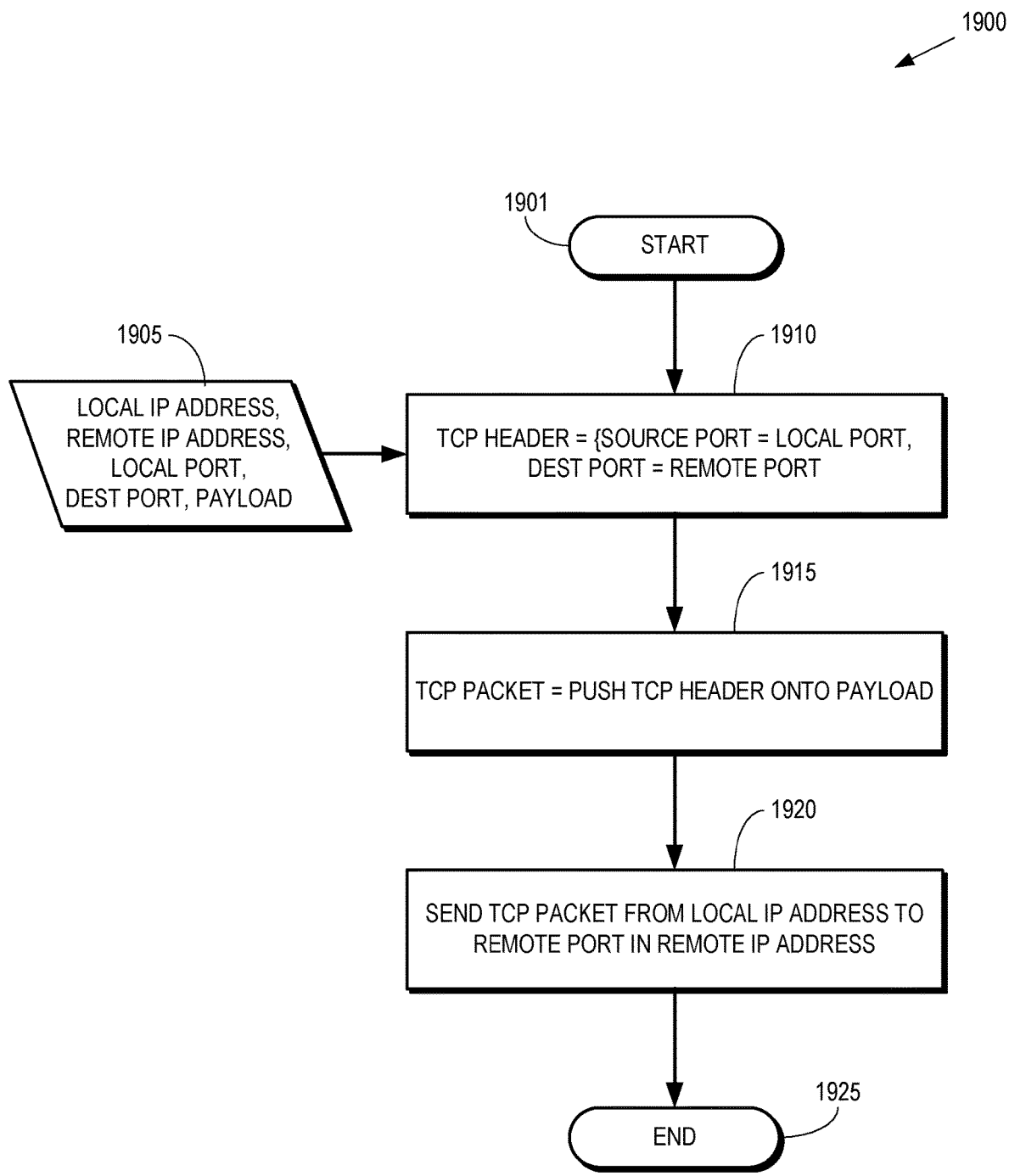
FIG. 19 is a flow diagram of a method of a conventional technique of transmitting packets on a TCP connection.

FIG. 19 is a flow diagram of a method 1900 of a conventional technique of transmitting packets on a TCP connection. The method 1900 begins at the block 1901. The method 1900 receives input 1905 including a local IP address used by the sender in the TCP connection, a remote IP address used by the receiver in the TCP connection, a local port at the sender, a remote port at the receiver, and a payload to be transmitted on the TCP connection.

At block 1910, the sender creates a TCP header with a source port field encoding the local port and a destination port field encoding the remote port. Other parameters can also be included in the TCP header. At block 1915, the sender pushes the TCP header onto the payload. At block 1920, the sender transmits the TCP packet from the local IP address to the remote IP address. The method 1900 terminates at the block 1925.

Figure 20:
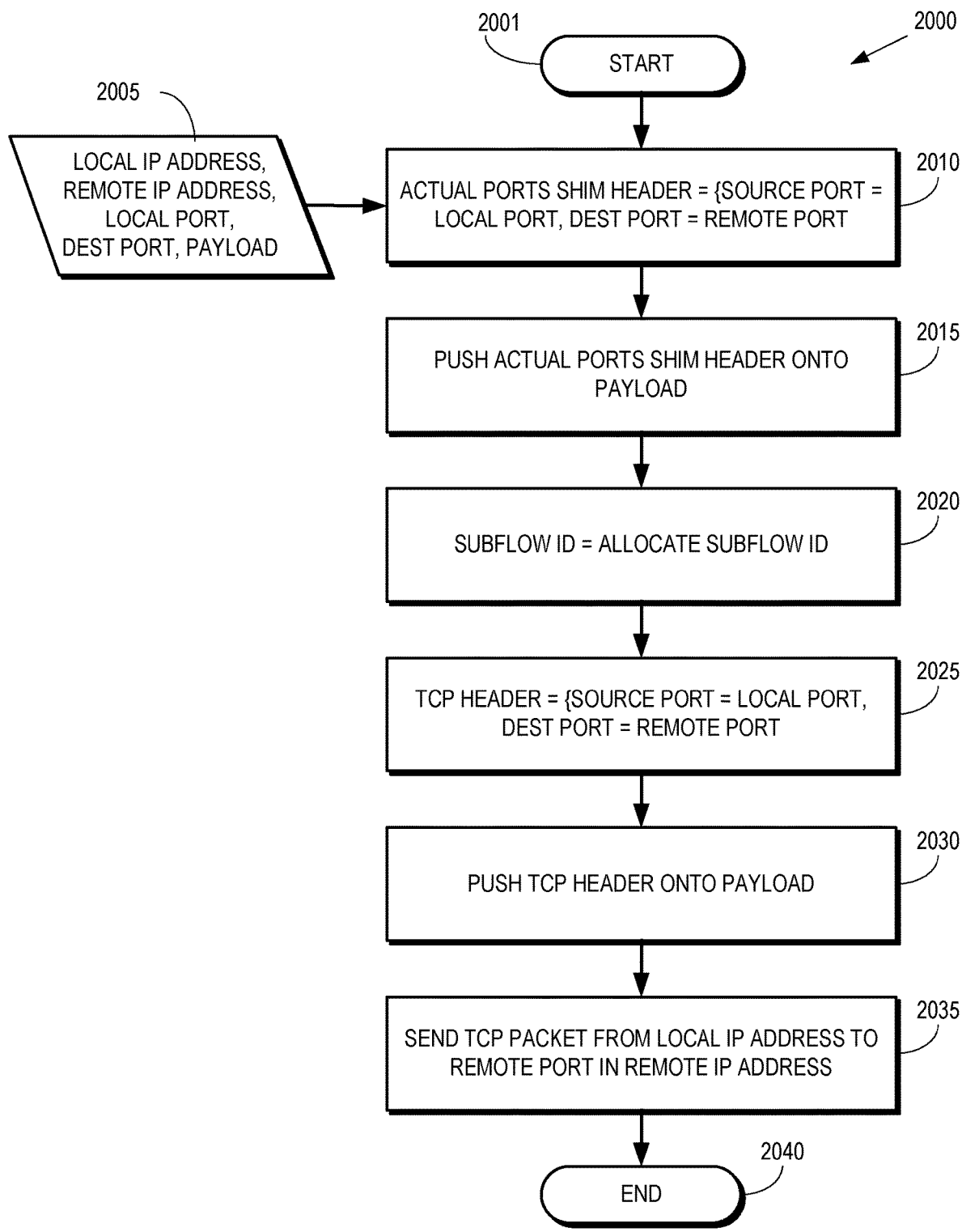
FIG. 20 is a flow diagram of a method of transmitting packets including a TCP shim header for load-balancing of a TCP connection according to some embodiments.

FIG. 20 is a flow diagram of a method 2000 of transmitting packets including a TCP shim header for load-balancing of a TCP connection according to some embodiments. The method 2000 is implemented in some embodiments of the communication system 600 shown in FIG. 6 and the communication system 700 shown in FIG. 7.

The method 2000 begins at the block 2001. The method 2000 receives input 2005 including a local IP address used by the sender in the TCP connection, a remote IP address used by the receiver in the TCP connection, a local port at the sender, a remote port at the receiver, and a payload to be transmitted on the TCP connection.

At block 2010, the sender creates an actual ports shim header that encodes a source port as the local port and a destination port as the remote port. At block 2015, the sender pushes the actual ports shim header onto the payload.

At block 2020, the sender allocates a subflow identifier on which the packet is transmitted. In some embodiments, custom approaches are used to determine the value of the subflow identifier. For example, the subflow identifiers can be allocated from a range of subflow identifiers using a round-robin allocation technique. The subflow identifier can also be a variable to increments in response to be transmitted packet and wraps around at the maximum value in the range of subflow identifiers.

At block 2025, the sender creates a TCP header for the packet that includes a source port field encoding the subflow identifier and a destination port field encoding the reserved port number that indicates the TCP shim layer. Other fields can also be encoded in the TCP header. At block 2030, the server pushes the TCP header onto the payload. At block 2035, the server transmits the TCP packet from the local IP address to the remote IP address. At block 2040, the method 2000 ends.

Figure 21:
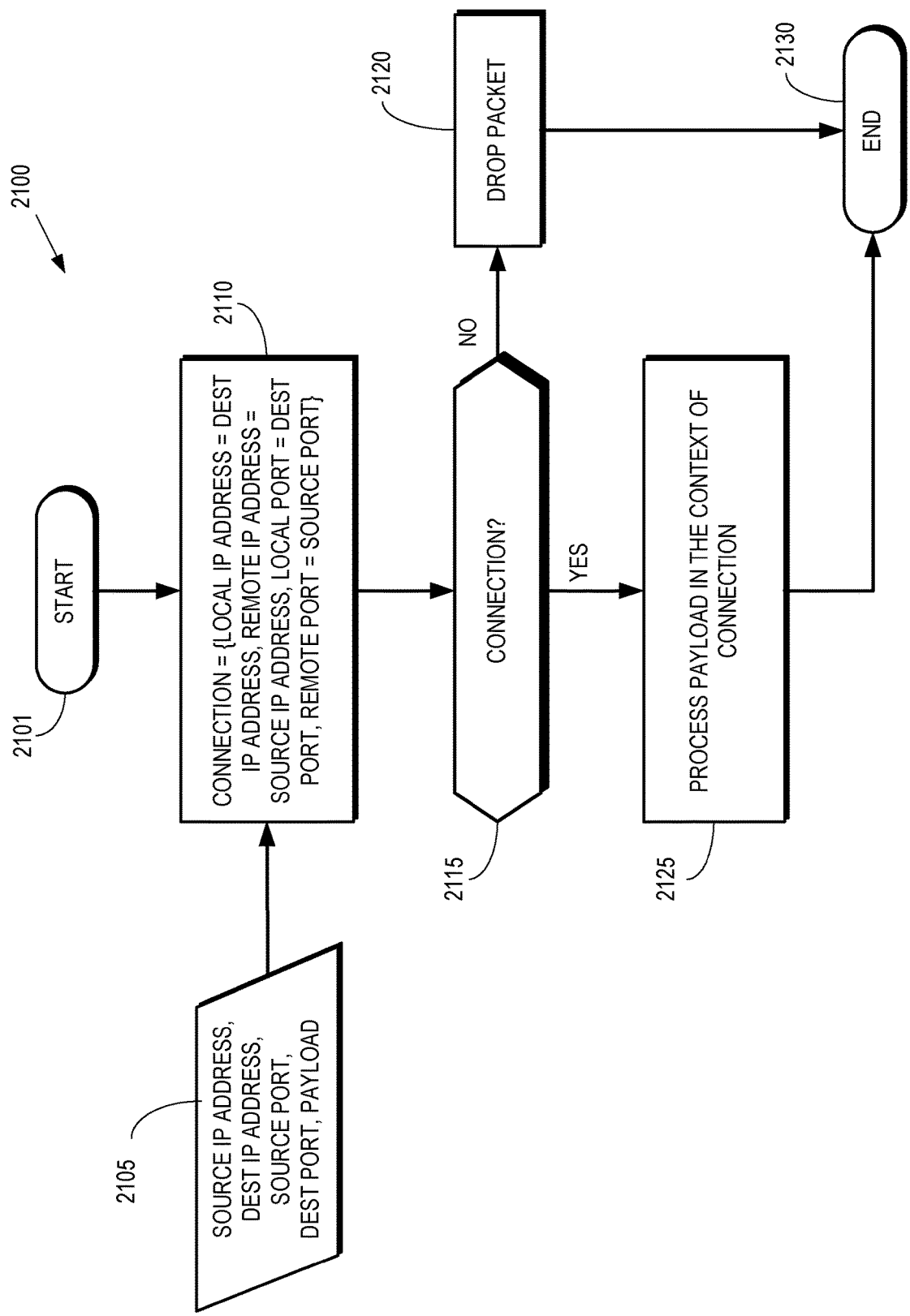
FIG. 21 is a flow diagram of a method of a conventional technique of processing packets received on a TCP connection.

FIG. 21 is a flow diagram of a method 2100 of a conventional technique of processing packets received on a TCP connection. The method 2000 begins at the block 2001. The method 2000 receives input 2005 including a source IP address of the sender of the TCP packet, a destination IP address that is a local IP address of the recipient of the TCP packet, a source port in the received TCP header, a destination port in the received TCP header, and a payload of the TCP packet.

At block 2110, the receiver prepares the four-tuple as {Local IP Address=Destination IP Address, Remote IP Address, Source IP Address, Local Port=Destination Port, Remote Port=Source Port}. The receiver also looks up the TCP connection that matches the view four-tuple.

At decision block 2115, the receiver determines whether a matching connection is found. If no matching connection is found, the method 2100 proceeds to block 2120. If a matching connection is found, the method 2100 flows to the block 2125.

At block 2120, the received packet is dropped. The method 2100 then flows to the block 2130 and the method 2100 ends. At block 2125, the receiver processes the payload in the context of the TCP connection. The method 2100 then flows to the block 2130 and the method 2100 ends.

Figure 22:
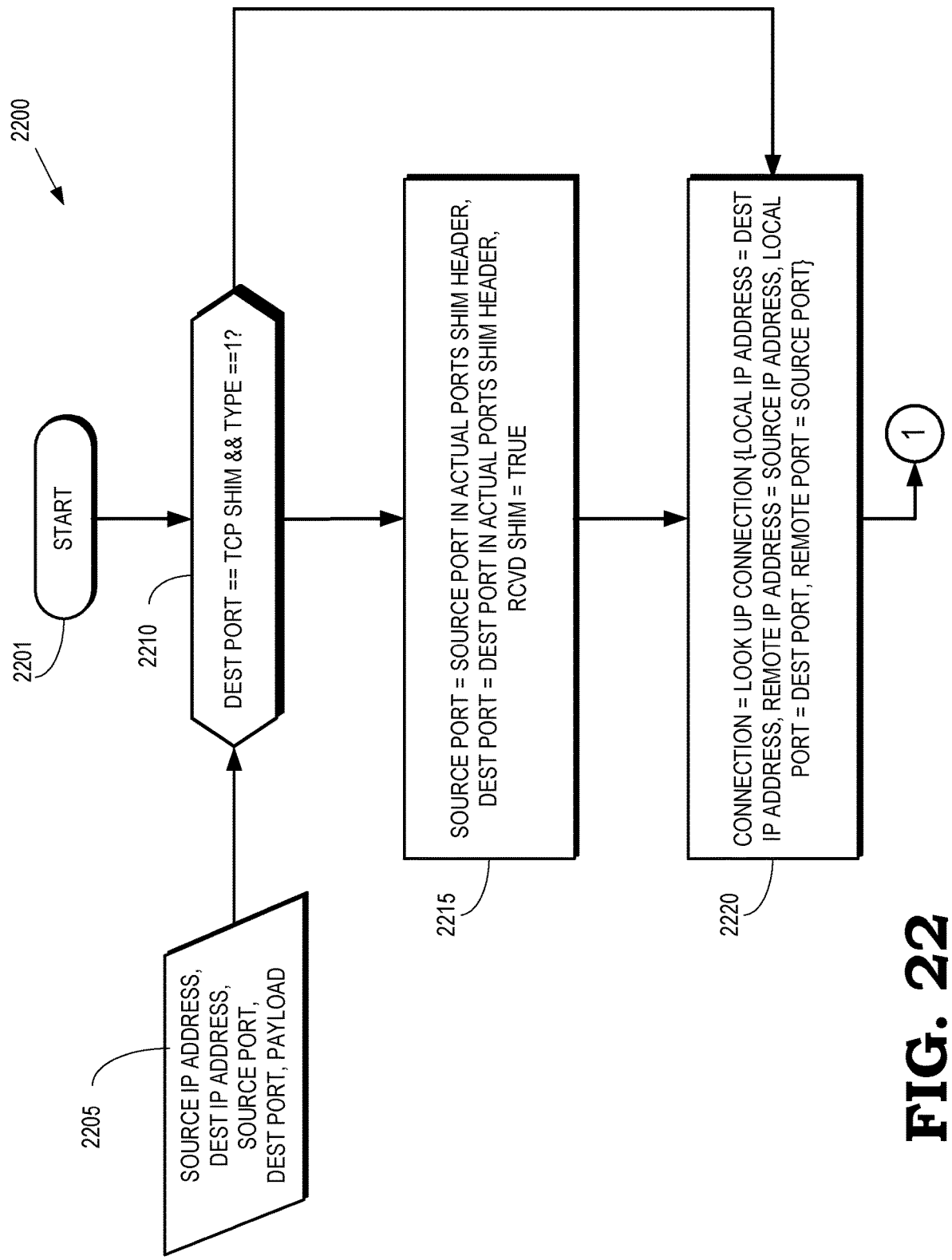
FIG. 22 is a flow diagram of a first portion of a method of processing received packets including a TCP shim header for load-balancing of a TCP connection according to some embodiments.

FIG. 22 is a flow diagram of a first portion of a method 2200 of processing received packets including a TCP shim header for load-balancing of a TCP connection according to some embodiments. The method 2200 is implemented in some embodiments of the communication system 600 shown in FIG. 6 and the communication system 700 shown in FIG. 7.

The method 2200 begins at the block 2201. The method 2200 receives input 2205 including a source IP address of the sender that transmitted the TCP packet, a destination IP address that is a local IP address of the recipient of the packet, a source port in the received TCP header, a destination port in the received TCP header, and a payload of the TCP packet.

At decision block 2210, the receiver determines whether a destination port encodes the reserved value that indicates the TCP shim layer. If so, and if the TCP shim header type is 1, which indicates an actual ports shim header, the method 2200 flows to the block 2215. Otherwise, the method 2200 flows to the block 2220.

At block 2215, the receiver reads the source port and the destination port field in the actual ports shim header. The receiver then overrides the respective input values as these are received from the TCP header.

At block 2220, the receiver prepares the four-tuple as {Local IP Address=Destination IP Address, Remote IP Address, Source IP Address, Local Port=Destination Port, Remote Port=Source Port}. The receiver also looks up the TCP connection that matches the four-tuple. The method 2200 then flows to the node 1, which connects to the decision block 2305 in FIG. 23.

Figure 23:
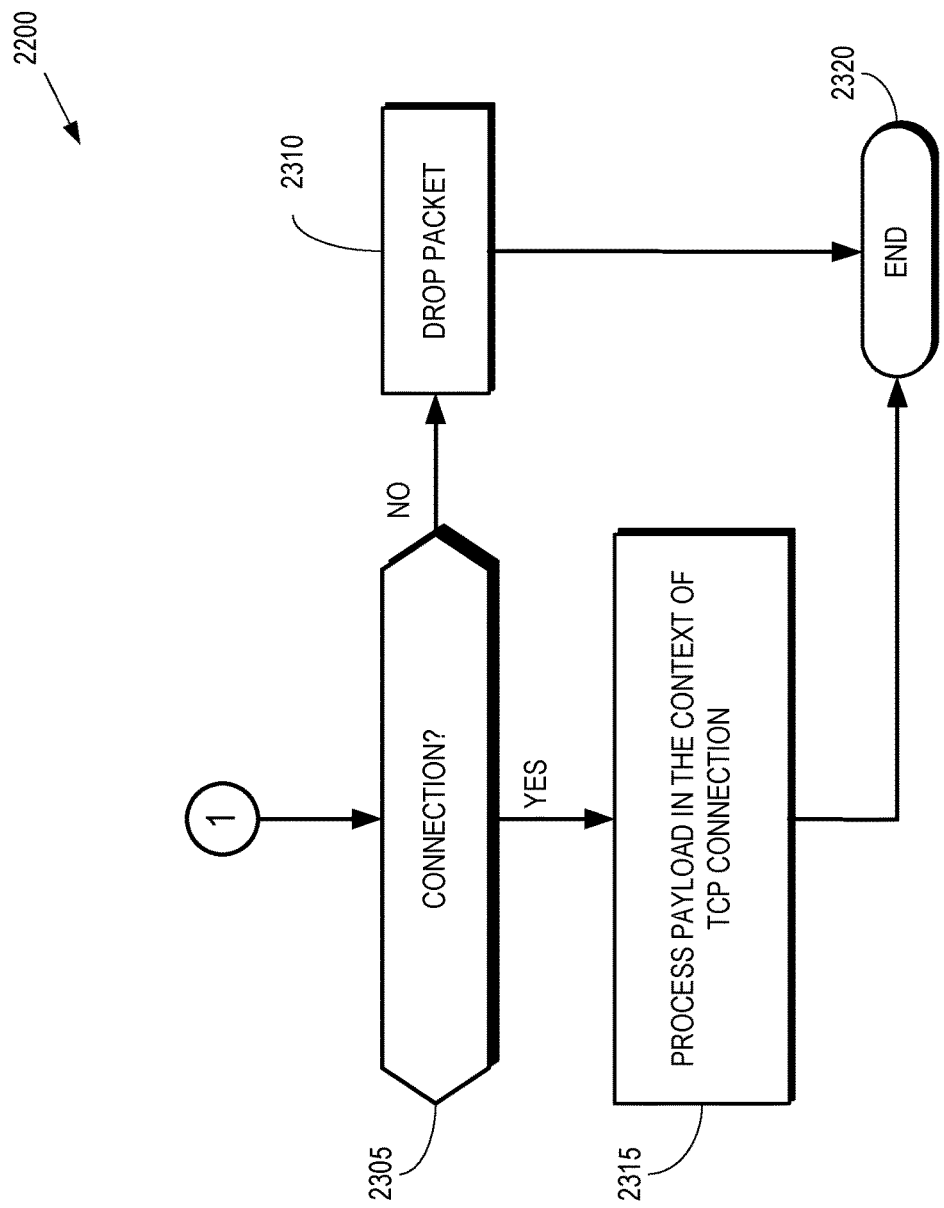
FIG. 23 is a flow diagram of a second portion of the method of processing received packets including a TCP shim header for load-balancing of a TCP connection according to some embodiments.

FIG. 23 is a flow diagram of a second portion of the method 2200 of processing received packets including a TCP shim header for load-balancing of a TCP connection according to some embodiments. The decision block 2305 is connected to the block 2220 in FIG. 22 via the node 1.

At decision block 2305, the server determines whether a connection that matches the four-tuple has been found. If not, the method 2200 flows to the block 2310. If a matching connection is found, the method 2200 flows to the block 2315.

At block 2310, the received packet is dropped. The method 2200 then flows to the block 2320 and the method 2200 ends. At block 2315, the receiver processes the payload in the packet in the context of the TCP connection. The method 2200 then flows to the block 2320 and the method 2200 ends.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    establishing a transmission control protocol (TCP) connection between a source and a destination based on a TCP source port number and a TCP destination port number;
    generating a TCP shim header comprising the TCP source port number and the TCP destination port number;
    generating a plurality of TCP headers comprising a plurality of proxy port numbers and a shim port number that indicates the TCP shim header; and
    transmitting a plurality of packets comprising the plurality of TCP headers and the TCP shim header.

2. The method of claim 1, wherein packets in the plurality of packets are routed along different paths between the source and the destination based on the plurality of proxy port numbers.

3. The method of claim 1, wherein establishing the TCP connection comprises establishing a TCP connection represented by a four-tuple comprising a source Internet protocol (IP) address, a destination IP address, the TCP source port number, and the TCP destination port number.

4. The method of claim 3, wherein establishing the TCP connection comprises transmitting a first packet from the source to the destination, the first packet comprising the TCP shim header and a first TCP header comprising a first proxy port number and the shim port number.

5. The method of claim 4, wherein establishing the TCP connection comprises receiving a second packet at the source from the destination, the second packet comprising the TCP shim header and a second TCP header comprising a second port number selected by the destination and the shim port number.

6. The method of claim 5, further comprising:
    reading, at the destination, the TCP shim header in the first packet; and
    establishing, at the destination, the TCP connection with the four-tuple comprising the source IP address, the destination IP address, the TCP source port number, and the TCP destination port number.

7. The method of claim 5, further comprising:
    reading, at the source, the TCP source port number and the TCP destination port number from the TCP shim header in the second packet; and
    establishing, at the source, the TCP connection with the four-tuple comprising the source IP address, the destination IP address, the TCP source port number, and the TCP destination port number.

8. The method of claim 7, further comprising:
    transmitting a third packet from the source to the destination, the third packet comprising the TCP shim header and a third TCP header comprising a first proxy port number from the plurality of proxy port numbers and the shim port number.

9. The method of claim 8, wherein transmitting the plurality of packets comprises transmitting a fourth packet from the source to the destination, the fourth packet comprising the TCP shim header and a fourth TCP header comprising a second proxy port number from the plurality of proxy port numbers and the shim port number.

10. An apparatus configured to act as a source of a transmission control protocol (TCP) connection, the apparatus comprising:
    a processor configured to establish the TCP connection based on a TCP source port number and a TCP destination port number associated with a destination, generate a TCP shim header comprising the TCP source port number and the TCP destination port number, and generate a plurality of TCP headers comprising a plurality of proxy port numbers and a shim port number that indicates the TCP shim header; and
    a transceiver configured to transmit a plurality of packets comprising the plurality of TCP headers and the TCP shim header.

11. The apparatus of claim 10, wherein packets in the plurality of packets are routed along different paths to the destination based on the plurality of proxy port numbers.

12. The apparatus of claim 10, wherein the processor is configured to establish a TCP connection represented by a four-tuple comprising a source Internet protocol (P) address, a destination IP address, the TCP source port number, and the TCP destination port number.

13. The apparatus of claim 12, wherein the transceiver is configured to transmit a first packet, the first packet comprising the TCP shim header and a first TCP header comprising a first proxy port number and the shim port number.

14. The apparatus of claim 13, wherein the transceiver is configured to receive a second packet at the source from the destination, the second packet comprising the TCP shim header and a second TCP header comprising a second port number selected by the destination and the shim port number.

15. The apparatus of claim 14, wherein the processor is configured to:
    read the TCP source port number and the TCP destination port number from the TCP shim header in the second packet; and
    establish the TCP connection with the four-tuple comprising the source IP address, the destination IP address, the TCP source port number, and the TCP destination port number.

16. The apparatus of claim 15, wherein the transceiver is configured to transmit a third packet comprising the TCP shim header and a third TCP header comprising a first proxy port number from the plurality of proxy port numbers and the shim port number.

17. The apparatus of claim 16, wherein the transceiver is configured to transmit a fourth packet comprising the TCP shim header and a fourth TCP header comprising a second proxy port number from the plurality of proxy port numbers and the shim port number.

18. An apparatus configured to act as a destination of a transmission control protocol (TCP) connection, the apparatus comprising:
a processor configured to establish the TCP connection based on a TCP source port number associated with a source and a TCP destination port number; and
a transceiver configured to receive a plurality of packets comprising a TCP shim header comprising the TCP source port number and the TCP destination port number, the plurality of packets further comprising a plurality of TCP headers comprising a plurality of proxy port numbers and a shim port number that indicates the TCP shim header.

19. The apparatus of claim 18, wherein packets in the plurality of packets are routed along different paths between the source and the destination based on the plurality of proxy port numbers.

20. The apparatus of claim 18, wherein the processor is configured to establish the TCP connection represented by a four-tuple comprising a source Internet protocol (P) address, a destination IP address, the TCP source port number, and the TCP destination port number.

21. The apparatus of claim 20, wherein the transceiver is configured to receive a first packet comprising the TCP shim header and a first TCP header comprising a first proxy port number and the shim port number.

22. The apparatus of claim 21, wherein the transceiver is configured to transmit a second packet comprising the TCP shim header and a second TCP header comprising a second port number selected by the destination and the shim port number.

23. The apparatus of claim 22, wherein the transceiver is configured to receive a third packet comprising the TCP shim header and a third TCP header comprising a first proxy port number from the plurality of proxy port numbers and the shim port number.

24. The apparatus of claim 23, wherein the transceiver is configured to receive a fourth packet from the source, the fourth packet comprising the TCP shim header and a fourth TCP header comprising a second proxy port number from the plurality of proxy port numbers and the shim port number.

* * * * *